(12) United States Patent
Kaas

(10) Patent No.: US 8,404,118 B2
(45) Date of Patent: Mar. 26, 2013

(54) FILTER UNIT WITH FILTER BANK

(75) Inventor: Povl Kaas, Herning (DK)

(73) Assignee: S R Light APS (DK)

( * ) Notice: Subject to any disclaimer, the term of this patent is extended or adjusted under 35 U.S.C. 154(b) by 77 days.

(21) Appl. No.: 12/936,359

(22) PCT Filed: Apr. 2, 2009

(86) PCT No.: PCT/DK2009/000085
§ 371 (c)(1),
(2), (4) Date: Jan. 5, 2011

(87) PCT Pub. No.: WO2009/121366
PCT Pub. Date: Oct. 8, 2009

(65) Prior Publication Data
US 2011/0108483 A1 May 12, 2011

(30) Foreign Application Priority Data

Apr. 3, 2008 (DK) .................................. 2008 00487
Jul. 11, 2008 (DK) .................................. 2008 00980

(51) Int. Cl.
*B01D 61/18* (2006.01)
*B01D 61/14* (2006.01)
*C02F 1/44* (2006.01)

(52) U.S. Cl. ................... 210/650; 210/252; 210/321.72; 210/321.79; 210/321.8; 210/321.88; 210/321.89; 210/322; 210/335; 210/433.1; 210/503; 210/510.1

(58) Field of Classification Search .................. 210/252, 210/258, 321.79, 321.8, 321.88, 321.89, 210/322, 335, 433.1, 503, 510.1
See application file for complete search history.

(56) References Cited

U.S. PATENT DOCUMENTS

| | | | |
|---|---|---|---|
| 5,262,047 | A | 11/1993 | Benskin et al. |
| 2004/0173532 | A1 | 9/2004 | Scharstuhl et al. |
| 2005/0047992 | A1 | 3/2005 | Dietrich et al. |
| 2006/0236668 | A1 | 10/2006 | Stobbe et al. |

FOREIGN PATENT DOCUMENTS

| | | |
|---|---|---|
| DE | 2263412 | 7/1974 |
| DE | 202006006832 | 10/2006 |
| EP | 1004398 | 5/2000 |
| EP | 1400761 | 3/2004 |
| EP | 1666118 | 6/2006 |
| GB | 2360712 | 10/2001 |
| WO | 2005092799 | 10/2005 |
| WO | 2007130029 | 11/2007 |

OTHER PUBLICATIONS

International Search Report; PCT/DK2009/000085; Dec. 7, 2009.

*Primary Examiner* — John Kim
(74) *Attorney, Agent, or Firm* — Cantor Colburn LLP

(57) ABSTRACT

The invention relates to a filter unit for purification of impure water, which could be seawater intended for ballast water, pool water, waste water or the like. The purification is performed by means of filter modules comprising filter means with dead end filter elements of a sintered material, and the filter unit facilitates alternating backwashing of the filter means at the same time as the filter unit may perform filtration of the impure water. The invention likewise relates to use of a dead end filter element in a de-gassing version, the filter element comprising a top end, a bottom end and a plurality of substantially parallel arranged channels with blockings in different ends.

20 Claims, 12 Drawing Sheets

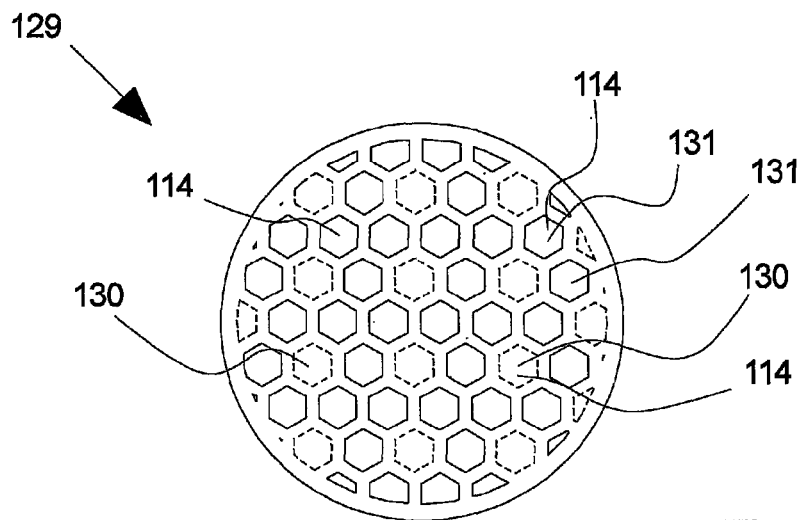
*Fig. 5d*
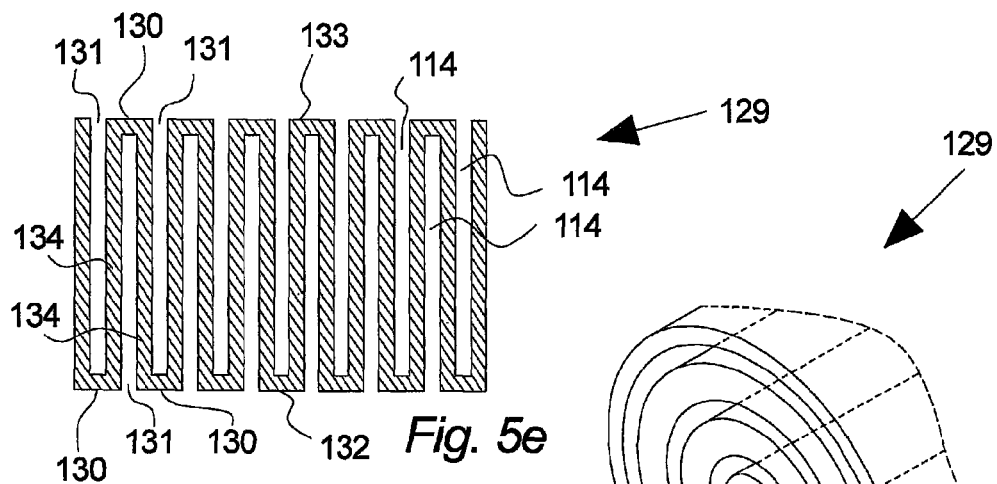
*Fig. 5e*
*Fig. 5f*
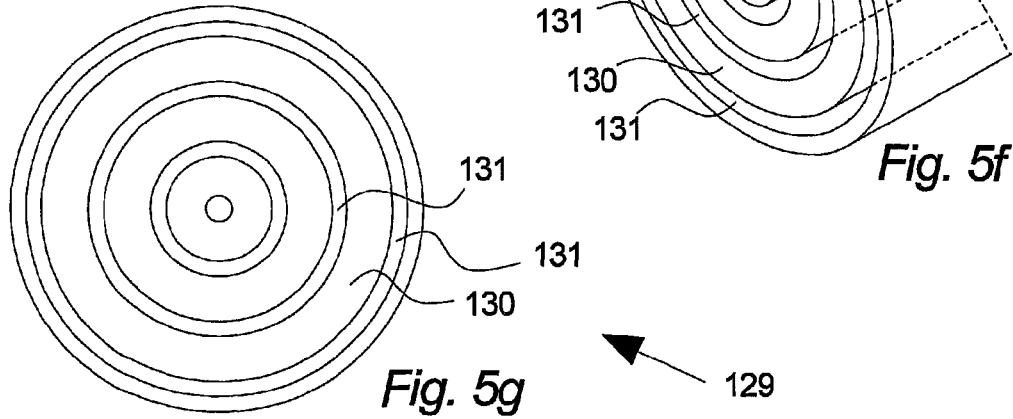
*Fig. 5g*

FILTER UNIT WITH FILTER BANK

BACKGROUND OF THE INVENTION

The present invention relates to a filter unit, and use hereof.

DESCRIPTION OF THE RELATED ART

Purification of impure water is a steadily increasing necessity both for producing drinking water, to ensure satisfactory cleansed water in pools, to ensure that transportation of impure water does not result in changes in the environment in the sea and the like. Especially transportation of seawater in ballast tanks can result in damages to the environment caused by the difference in the sea fauna around the world. When a ship is travelling on the sea, it is possible that impure seawater can transfer material, bacteria, microorganisms and the like, which can be harmful to the sea environment, if the water from the ballast tanks is let out in the sea at another location than it is entered into the ballast tanks. Further the already existing pollution of the sea e.g. oil, tar, and other materials has unwanted effects in the ballast tanks.

WO 2007/130029 A1 describes a water filtration system e.g. for use in ballast water treatment. The filter elements are wedge wire filters, and the filter facilitates back flushing by back flushing one filter element at the time, so filtered water is delivered through the other filter elements. It is water filtered by the water filtration system that is used for back flushing of said water filtration system. Ultraviolet light treatment chambers are likewise disclosed in order to inactivate aquatic species including bacteria, microorganisms and pathogens.

WO 2005/092799 A1 describes a process for purifying impure water, e.g. seawater, by means of a microfiltration or ultra filtration unit, and reverse osmosis. The process likewise facilitates backwash/back flushing, by means of saline water from a reverse osmosis unit. The microfiltration or ultra filtration unit comprises cross flow filters for purifying the seawater. This invention suffers from the disadvantage that the microfiltration or ultra filtration units used are cross flow filters with high power consumption.

In general ultraviolet irradiation treatment suffers from some disadvantages, when it is used for ballast water e.g. for sea vessels. Ballast water is often collected from basins which comprise water polluted with oily material and the like. The material settles on the ultraviolet lamps, and is hereby burned onto the ultraviolet lamps caused by the heat from the ultraviolet lamps during the treatment, which result in a decreasing ultraviolet irradiation treatment. This causes considerably requirements to the maintenance of the ultraviolet lamps to ensure a continuous effective ultraviolet irradiation. Further, the use of ultraviolet irradiation treatment suffers from the disadvantage, that the penetration ability of the ultraviolet irradiation in muddy and unclear water is very poor, which result in water which is not satisfactory cleansed.

Further, the use of cross flow filters in general very energy consuming since a continuous flow of water is necessary to keep the cross flow filters clean.

Thus, it would be desirable to provide a filtration device for efficient purification of water without the above drawbacks of the prior art. Other advantages will be clear from the description below.

SUMMARY

The disclosure relates in a de-gassing version to a filter unit for filtering a liquid. The de-gassing version of the filter unit comprises at least one dead end filter element made of a permeable material for filtering a liquid, which at least one dead end filter element comprising a top end, a bottom end and a plurality of substantially parallel arranged channels extending between the top end and the bottom end and comprising a first end and a second end, which plurality of substantially parallel arranged channels are separated by walls of said permeable material, wherein the end of a first group of said channels are blocked at said top end of said dead end filter element and open at said bottom end of said dead end filter element, and the end of a second group of said channels are blocked at said bottom end of said dead end filter element and open in said top end of said dead end filter element, wherein said at least one dead end filter element is arranged so that the longitudinal axis of said channels are kept in an angle between 10° and 170° compared to horizontal, such as between 30° and 150°, desirably between 70° and 110° such as around 90°, and wherein said filter unit comprises a flow driving arrangement for providing a fluid flux from the openings of the channels comprising open ends at the top end of said at least one dead end filter element, into the channels comprising open ends at the top end of said at least one dead end filter element, through the walls of permeable material to the channels comprising open ends at the bottom end of said at least one dead end filter element, and out of the open ends at the bottom end of the at least one dead end filter element.

By arranging the filter element so that the flow of liquid such as water is substantially in the direction of gravity, i.e. downwards, harmful gasses such as e.g. THM (Trihalomethans), AOX (Adsorbable Organic Halogens) and chloramines, released from the water before and during the filtration, will not block the channels of the filter element as the gasses will move upward away from the filter element. This increases the area used for filtering the liquid, since no gasses are gathering at the channels blocked at the top end of the dead end filter element.

Further when the channels of the dead end filter elements are kept in an angle different from 90° compared to horizontal, e.g. such as 15°, 35° 160°, 170° or the like, the surface area of the water in the channels with open ends at the top end of the dead end filter element is increased, hereby facilitating advantageous increased releasing of harmful gasses. Keeping the channels in an angle different from 90° compared to horizontal however at the same time results in that a reduced area of the permeable walls between the channels are used for filtering of liquid. To optimize that the area of the permeable walls between the channels are used for filtering of water, the channels may be kept substantially at 90° compared to horizontal, which at the same time facilitates releasing of harmful gasses from the water through the channel openings at the top end of the filter element. The plurality of channels in the filter element results in a dead end filter element with a large filtering area, thereby facilitating filtering at an advantageous flux value, since the pressure loss through the filter element is very low. This gives a very energy saving and space saving dead end filter element.

It is understood that the filter unit in the de-gassing version is not limited to the aspects of the de-gassing version of a filter unit described below, but may also comprise one or more of the above-described embodiments and specific technical features of a filter unit.

In an aspect of the de-gassing version of a filter unit, the flow driving arrangement comprises vacuum means arranged for providing a vacuum at the bottom end of said at least one dead end filter element. Hereby an advantageous method of filtering water is achieved. The vacuum increases the releasing of gasses from the water, caused by the lowered boiling point of water during vacuum, and the lowered solubility of gasses in the water during vacuum. The vacuum means may be a vacuum pump or the like, arranged substantially at the bottom end of the filter element, but it us understood that the vacuum means may be suitable arranged anywhere in the filter unit, causing a vacuum at the bottom end of the filter element(s).

In an aspect of the de-gassing version of a filter unit, the vacuum means are suitable for providing a vacuum at the bottom end of said at least one dead end filter element, desirably so that the absolute pressure is in the range of 0.01 to 0.9 bar, such as most desirable between 0.3 and 0.8 bar. Hereby an advantageous vacuum is applied for causing a fluid flux through the filter element.

In an aspect of the de-gassing version of a filter unit, the flow driving arrangement comprises pressure means arranged for providing a pressure at the top end of at least one of said at least one dead end filter element. By applying a pressure at the filter elements, an increased flow is achieved through the filter element(s). In an aspect of the invention the flow driving arrangement comprises both pressure means and vacuum means which may be used alternating or in combination.

In an aspect of the de-gassing version of a filter unit, the dead end filter element is a ceramic filter element.

Ceramic filters are cost efficient filter elements and the experience with ceramic filters for filtering liquid is comprehensive. It is understood that by the term "ceramic filter element" is understood any filter element made of a ceramic material, made e.g. by pressing a ceramic material into a forming tool, by sintering the ceramic material or the like.

In an exemplary aspect of the de-gassing version of a filter unit, the dead end filter element is made from sintered silicon carbide. Sintered silicon carbide as a filter material is very advantageous, caused by the great strength of sintered silicon carbide. Hereby it is possible to make thinner walls between the channels, causing the possibility of enlarge numbers of channels and hereby an enlarged filtering area. Sintered silicon carbide is extremely heat resistant, has a high durability and facilitates easy cleansing, also with a reduced amount of chemicals compared to conventional filter elements. Further sintered silicon carbide is manufactured in large scales which makes it a cost efficient material for making effective filters. It is likewise possible to apply flocculation chemicals directly on filters made of sintered silicon carbide, which is not possible with numerous other filter types. A dead end filer element comprising channels as described and made of sintered silicon carbide further facilitates space saving filter elements with a low pressure loss and at the same time small pore sizes.

In an aspect of the de-gassing version of a filter unit, the filter unit is adapted to release particles intercepted from a liquid filtered by said at least one dead end filter elements filter element by means of pressurised air and/or water applied at the bottom end of said at least one dead end filter element. Pressurized air and/or water is hereby let through the channels with openings in the bottom end of the filter element and through the permeable walls, hereby releasing the particles, sorted out from the liquid, from the pores of the filter element. This facilitates an easy cleansing and releasing of material sorted out from the water/liquid by the filter element. It is understood that back wash, steam and the like as described earlier likewise may be used alone or in combination for cleaning the filter elements in the filter unit.

In an aspect of the de-gassing version of a filter unit, the pore sizes of the filter elements is between 2 mm and 0.001 µm, e.g. between 20 µm and 0.03 µm, such as between 15 µm and 0.04 m. Hereby the water filtered by the filter unit may be so pure that it significantly reduces the amount of necessary added chemicals, such as chlorine or the like, to water in swimming pools, water parks or the like.

In an aspect of the de-gassing version of a filter unit, the filter unit comprises gas outlet means. Hereby it is possible to vent the harmful gas released from the filtered water away from the filter unit.

In an aspect of the de-gassing version of a filter unit, the filter unit comprises at least two of said dead end filter elements wherein at least one of said at least two dead end filter elements, having a first pore size, is arranged in a first filter module, and wherein at least one other of said at least two dead end filter elements is arranged in a second filter module, said second filter module being serially arranged after the first filter module to filter water that in operation has been filtered by the first filter module, the pore size of the at least one dead end filter element of said second filter module being of a smaller pore size than the at least one filter element of said first filter module, and wherein liquid from the open ends of the channels at the bottom end of the at least one dead end filter element arranged in said first filter module is adapted to be let into the open ends of the channels adapted to be inlets of the at least one dead end filter element arranged in the at least one second filter module. Hereby the harmful gasses from the water, released e.g. during vacuum, released between the first filter module and the second filter module can be removed at the second filter module. The filter unit may comprise a plurality of serially arranged filter modules, such as three, four five or even more filter modules, each filter module comprising at least one filter element, but could also comprise a plurality of parallel arranged filter elements. Further, since the pore size of the filter element(s) in the at least one second filter module is smaller than the pore size of the filter element(s) in the first filer module, a gradual filtering of the liquid is achievable, which results in an increased fluid flux through the filter unit, and the time between the cleansing of the filter elements may be increased.

In an aspect of the de-gassing version of a filter unit, vacuum means are arranged for providing a vacuum at the bottom end of the at least one dead end filter element arranged in the last of the serially arranged filter modules. This gives the advantages of only applying vacuum at one location in the filter unit, which is a cost efficient solution which also is easy to maintain. However it is understood that in another aspect of the invention, vacuum may be applied between the serially arranged filter elements, causing a vacuum at the bottom end of some serially arranged filter elements, and a pressure at the top end of other filter elements in the series of filter elements.

In an exemplary aspect of the de-gassing version of a filter unit, at least one of said filer modules comprises at least two parallel arranged dead end filter elements. Hereby an enlarged fluid flux is possible in the filter unit, giving the advantage of reduced power needed to achieve the necessary/wanted fluid flux of filtered water through the filter unit. It is understood that the filter modules may comprise a plurality of parallel arranged filter elements as described earlier.

In an aspect of the invention, the filter unit in the de-gassing version is used for removal of silt from water. Silt is a large problem in both freshwater, e.g. when purification of the freshwater into drinking water, and salt water, e.g. when salt water is used in ballast tanks or drinking water. Since the filter element(s) comprises channels as described, the filtering area is increased which increases the time interval with which the filter elements has to be cleansed for silt sorted out from the water. A dead end filer element made of sintered silicon carbide further facilitates space saving filter elements with a low pressure loss and small pore sizes which is very advantageous in relation to sorting out silt from drinking water, which makes the filter unit advantageous in relation of sorting out sit from water.

In an aspect of the invention, the filter unit in the de-gassing version is used for purification of recirculating chlorinated water. Since the filter elements facilitates releasing of gasses as described earlier the releasing of gasses such as THM (Trihalomethans), AOX (Adsorbable Organic Halogens) and chloramines is very advantageous in relation to purification of recirculating chlorinated water in e.g. water parks, swimming pools and the like. Likewise the filter unit according to the invention facilitates a large fluid flux achieved with low power, compared to conventional filtering units for filtering chlorinated water.

In an aspect of the invention, the filter unit in the de-gassing version is used for purification of slurry. The before-mentioned releasing of gasses makes the filter unit in the de-gassing version very advantageous for filtering slurry.

In an aspect of the invention, the filter unit in the de-gassing version is used for at least partly purifying of water into drinking water. The filter unit in the de-gassing version gives the advantage of filtering an increased amount of water, which is advantageous in relation to filtering water into drinking water. Further, since the filter unit is energy saving the filter unit may be used at areas in the world which does not have a large amount of energy available.

In an aspect of the invention, the filter unit in the de-gassing version, when used for at least partly purifying of water into drinking water, is also used for removing silt from the water. Large areas of the world suffer from lack of drinking water, partially caused by pollution of the water by among other thins silt. It is therefore advantageous to remove slit from the water, and purify the water into drinking water by using the same filter unit.

The present invention likewise relates to use of a dead end filter element made of a permeable material for filtering a liquid, said dead end filter element comprising a top end, a bottom end and a plurality of substantially parallel arranged channels comprising a first end and a second end, which plurality of substantially parallel arranged channels being separated by walls of said permeable material, wherein the end of a first group of said channels are blocked at said top end of said dead end filter element and open at said bottom end of said dead end filter element, and the end of a second group of said channels are blocked at said bottom end of said dead end filter element and open in said top end of said dead end filter element, wherein said dead end filter element is arranged so that the longitudinal axis of said channels are kept in an angle between 10° and 170° compared to horizontal, e.g. between 30° and 150°, desirably between 70° and 110° such as around 90°, and wherein, a fluid flux is lead from the openings of the channels comprising open ends at the top end of said at least one dead end filter element, into the channels comprising open ends at the top end of said at least one dead end filter element, through the walls of permeable material to the channels comprising open ends at the bottom end of said at least one dead end filter element, and out of the open ends at the bottom end of the at least one dead end filter element is created by means of a vacuum applied at the bottom end of said dead end filter element.

Hereby a very advantageous use of dead end filter element, e.g. made of a ceramic material such as sintered silicon carbide, for filtering e.g. impure water, is achieved. Caused by the blockings of some of the channels in the top end of the filter element, and the blockings of other channels in the bottom end of the filter element, the filter element is a dead end filter with a large filter surface, and at the same time a considerably amount of space is saved compared to conventional dead end filters. Further, since the filter element is adapted for a fluid flux through the filter element by means of vacuum applied at the bottom end of the dead end filter element, an enlarged amount of gasses are released from the filtered water caused by the lowered boiling point of water during vacuum, and the lowered solubility of gasses in the water during vacuum. At the same time, caused by the arrangement of the filter element in an angle between 10° and 170° compared to horizontal, the releasing/de-gassing of harmful gasses from the open ends of the channels in the top end of the filter element is possible.

In an aspect of the use of a dead end filter element, flocculation chemical is added to the impure water before the liquid reaches the inlets of the filter element. With conventional filter elements, the filter elements are clogged when flocculation chemicals are used directly on the filter elements, hereby causing the need of pre-filters. Use of a dead end filter element according to the invention is not getting clogged when flocculation chemicals are used directly on the filter element, especially if the filter element is made of sintered silicon carbide. This gives the opportunity of saving pre-filters for collection of flocculated material.

In an aspect of the use of a dead end filter element, the dead end filter element is used for removal of silt from water. The dead end filter element, e.g. made of sintered silicon carbide is space saving, energy saving and at the same time it facilitates large filter areas at a small area, which is advantageous in relation to sorting out silt from water.

In an aspect of the use of a dead end filter element, the dead end filter element is used for purification of recirculating chlorinated water. The before mentioned evaporation/releasing of harmful gasses from the water is especially advantageous when the filter element is used with recirculating chlorinated water from swimming pools, water parks and the like. Such harmful gasses could e.g. be THM (Trihalomethans), AOX (Adsorbable Organic Halogens) and chloramines which are harmful to people and the environment, and are hard to remove in conventional filtering systems.

In an aspect of the use of a dead end filter element, the dead end filter element is used for purification of slurry. The releasing of gasses makes the dead end filter element very advantageous for filtering slurry.

In an aspect of the use of a dead end filter element, the dead end filter element is used for at least partly purifying of water into drinking water. Drinking water is in short supply in large areas in the world. Use of a dead end filter element according to the invention comprises the possibility of purifying a large amount of drinking water fast, cost efficiently and environmentally friendly. The dead end filter element may in an embodiment of the invention be used together with reverse osmosis filters In an aspect of the use of a dead end filter element for at least partly purifying of water into drinking water, the dead end filter element is also used for removing silt from the water. This is advantageous since large areas in the world have problems with silt in the water, and at the same time has increased needs for drinking water.

The invention also relates to a filter unit for purifying impure water and comprising a filter bank having a first filter module comprising filter means with a first pore size, a second filter module serially arranged after the first filter module to filter water that in operation has been filtered by the first filter module, the filter means of said second filter module being of a smaller pore size than the filter means of said first filter module, wherein each of said filter means comprises at least two parallel arranged filter elements, and wherein the filter elements of the filter means of at least two of the filter modules in said filter unit comprises filter elements which are dead end filter elements made of a sintered material, the filter unit further comprising means for backwashing of each of said filter means by means of water purified by said filter unit, wherein said means for backwashing is arranged for alternating backwashing of individual of said parallel filter elements of each module so as to allow for continuous operation of the filter unit during backwashing of individual filter elements.

For the purpose of this application, by the term "backwash" is meant that filter elements are cleansed by means of a flow in the substantial opposite direction than the direction with which the impure water is filtered and hereby purified. The flow for cleansing the filter elements could be water, chemicals, steam and/or any other suitable means which is desirably pressurized during backwashing to ensure an effective cleansing.

Further, for the purpose of this application, the term "dead end filter" or "dead end filtration" shall be understood as a technique where substantially all the fluid passes through a membrane filter element, and all particles larger than the pore size of the filter are retained at the surface of the filter element or in the filter element. The dead-end filter element comprises a plurality of channels blocked in an end of the filter element. The flow of liquid to be filtered is arranged to be substantially parallel with the membrane in the channels, and substantially perpendicular to the membrane at the blocked end of the filter elements. It is understood that the dead end filter may comprise channels all blocked in the same end of the filter element (e.g. permanently or by valve means), or blocked in different ends of the filter element.

In an embodiment of the invention, the dead end membrane filter elements are asymmetric membrane filter elements with different pore sizes, and where the asymmetric membrane filter elements are arranged so that the pores in the filter elements facing the liquid to be filtered are the smallest pores of the filter element. This may e.g. be relevant where the filter elements comprises a support layer comprising pores of a larger size, to strengthen the filter elements. Thereby, internal blockage of the filter elements are prevented, and a limited backwash of the filter element can easily release the material held back by the dead end filter element(s).

A filter unit according to the invention facilitates gradual filtering of the water which gives a plurality of advantages, e.g. reduced clogging of the filter elements, since the size of the particles in the filtered water is controlled, and at the same time it assures a more uniform flow through the filter unit. It is further an advantage, that the backwashing is performed by means of water filtered by said filter unit, since an external supply of pure water for backwash is not necessary. Further this solution result in a very effective, fast and reliable filter unit, since the filter unit facilitates both backwashing of filter elements of a filter module, and filtration of water simultaneously produced by filter elements of the same filter module.

Further the parallel arranged filter elements gives the advantage of a uniform flow through the filter unit, and at the same time facilitates alternating backwashing of the filter elements. Likewise by avoiding treating the water with ultraviolet radiation and at the same time being capable of sorting out the aquatic species including bacteria from the water, a very reliable and energy saving filter unit is achieved, which require much less maintenance than the alternative use of an ultraviolet lamp.

It is noted that a filter module can comprise a plurality of filter elements. Hereby it is possible to reduce the overall trans membrane pressure needed to achieve a predetermined flux, hereby saving a considerably amount of power.

Further, by utilising dead end filter elements instead of e.g. cross flow filter elements a significant amount of energy is saved, since no cross flow pumps are necessary, and since a reduced amount of high-pressure pumps are necessary. Hereby, a more environmental friendly and at the same time cost efficient filtration is achieved.

In an advantageous embodiment of the invention said means for backwashing comprises means for backwashing each of said filter elements by means of a flow of water obtained from an outlet of purified water from the filter module of the filter element subjected to backwashing.

It is noted that the filter unit according to the invention could facilitate short bursts of back flushed water to loosen material on and/or in the filter elements.

In an embodiment of the invention said filter unit comprises at least one compartment between said serial arranged filter modules adapted for temporary storage of filtered water intended for backwashing and/or further filtering of filter elements in subsequent filter modules. Hereby it is possible to ensure that enough water is present for backwashing and further filtration by other filter means, which results in a very reliable filter unit.

In an embodiment of the invention said filter bank comprises a plurality of filter modules, desirably at least three filter modules, each with filter means with a smaller pore size compared to the pore size of the filter means of the previous filter module. Hereby it is possible to obtain a very effective gradual filtration of the impure water and at the same time prevent clogging.

In an advantageous embodiment of the invention at least one of said filter elements is made of sintered silicon carbide.

For the purpose of this application, by the term "sintered" or "sintered material" shall be understood a porous coherent material made by means of heating a material without melting the material.

During the sintering of the material the material could likewise be pressurised, and further comprise heat activated adhesive means. The material which is heated without being melted to produce the coherent material is typically in the form of a powder with a predefined particle size. Such powder could e.g. be silicon carbide powder, ceramic powder, polymer powder, metal powder, carbon powder, glass powder, a combination of different powders or any other suitable means.

Sintered silicon carbide is a very advantageous material for use in filter elements according to this invention, caused e.g. by the extremely large wear ability and possibility of easy cleansing. Further sintered silicon carbide is manufactured in large scales which makes it a cost efficient material for making effective filters. Still further, filters made of sintered silicon carbide has a good coefficient of utilization since the pressure loss through a sintered silicon carbide filter is low, which makes the filter gentle to the environment. At the same time sintered silicon carbide has a great endurance and does not need the same amount of cleansing compared to a plurality of other materials.

In an embodiment of the invention, the average pore size of said filter means of the first filter module is at least 10 times the average pore size of the second filter module.

In an embodiment of the invention, the average pore size of said filter means of the first filter module is at least 100 times the average pore size of the second filter module.

In an embodiment of the invention, the average pore size of said filter means of the first filter module is at least 1000-20000 times the average pore size of the second filter module It is hereby achieved that the purified water can be purified enough to live up to the strict demands for water utilised e.g.

as ballast water, chlorinated pool water or the like. At the same time the purified water is obtained in an environment friendly, effective and cost efficient way. It is further advantageous to utilise a plurality of filter elements with small pore sizes (such as 0.03 µm, 0.02, µm 0.002 µm and the like), since the pressure (or vacuum) needed to achieve a fluid flux through the filter elements is largely decreased. It is hereby obtainable that a pressure (or vacuum) of 0.5 bar or even as low as below 0.1 bar is sufficient to obtain the desired total fluid flux through the filter elements, which saves a great amount of power in operating the filter. The lower the flow velocity is at the entrance of a filter element, the lower is the pressure loss and thereby the power loss of driving the fluid flow through the filter element. Due to the low cost of the sintered filter elements it is an advantage to increase the number of filter elements in order to reduce the overall power consumption of operating the filter.

In an aspect of the invention, said first filter module and said second filter module both comprises dead end filter elements.

In an embodiment of the invention the filter unit comprises at least one outlet for impure water from backwash of said filter means. Hereby mixing of already sorted out material and impure water for cleaning is prevented.

In an exemplary embodiment of the invention the sintered material is a sintered material such as sintered silicon carbide (as mentioned earlier), sintered ceramics, sintered polymer, sintered metal, sintered carbon, sintered glass or the like.

Hereby it is possible to achieve very advantageous filter elements, since it is the size of the grains of the powder that is deciding the pore sizes of the filter elements. Further sintering is a cost efficient solution to make a filter with small pore sizes such as 2 mm, 0.2 mm, 20 µm, 0.2 µm 0.001 µm or the like. Likewise, dead end filter elements made of a sintered material may increase the fluid flux through the filter elements.

In an advantageous embodiment of the invention the backwash means are adapted for alternating backwashing of filter elements of a plurality of filter modules simultaneously. Hereby a fast and effective backwashing is achieved.

In an embodiment of the invention the filter modules and/or filter elements are replaceable. Hereby it is possible to adjust the number of filtering stages which gives the advantage of making the filter unit very adjustable for different purposes. Further it is a cost efficient solution since it is possible to manufacture filter units by connecting prefabricated filter modules. Still further it is possible to manufacture a cost efficient filter unit with varying filtering properties, i.e. making it possible to adjust the particles sorted out by the filter unit. Likewise it is possible to replace damaged filter elements and or filter modules.

In an advantageous embodiment of the invention at least one of said at least one filter module is a reverse osmosis filter. By utilising reverse osmosis filters, it is possible to desalinate water, hereby facilitating assessment of manufacturing of e.g. drinking water.

In an embodiment of the invention the filter unit comprises at least three serially arranged filter modules, each with at least two parallel filter elements, wherein the pore sizes of said filter elements of a subsequent filter module is decreased compared to the pore sizes of the filter elements of the previous filter. Hereby it is possible to purify water without blocking the filter modules. Further it is possible to purify the water to an extent where no foreign object such as particles, organic material, biological material and the like is present in the water. Still further it is possible to achieve an increased flow of water through the filter.

In an embodiment of the invention the filter unit comprises means for cleansing of said filter elements by means of pressurised steam. Hereby it is possible to achieve a cleansing of the filter element which is very gentle to the environment. Normally the cleansing of a filter which is polluted with adherent material e.g. oil, tar or the like is cleansed by means of powerful chemicals which is harmful to the environment. By using steam for cleansing of the filter elements it is possible to spare the environment and at the same time achieve sufficient and efficient cleansing of the filter. By pressurising the steam it is possible to obtain a high efficiency during cleansing of the filter. Further it is possible to achieve a fast cleansing of the filter.

In an advantageous embodiment of the invention the filter unit is adapted for cleansing of the filter elements by steam generated by water which is at least partly purified by said filter unit. Hereby it is ensured that the water used for said backwashing is clean enough to prevent the filter elements from blocking, and at the same time an external water/steam supply is not necessary.

In an embodiment of the invention the filter unit is adapted for cleansing of said filter elements by means of both pressurised steam and pressurised water. Hereby it is possible both to remove particles by means of pressurised water, and effectively remove adhesive material such as tar, oil, fat and the like by means of steam It is noted that the filter elements in an embodiment of the invention could be cleansed by backwashing pressurized water alone without the use of pressurised steam, cleansed by means of chemicals such as e.g. flocculation chemicals, cleansed by means of steam or any combination thereof.

In an embodiment of the invention said filter unit comprises steam generator means for producing said pressurised steam.

In an embodiment of the invention the steam generator is arranged for producing pressurised steam at a temperature in the interval 100° C.-200° C., such as between 120° C.-150° C., desirably between 125° C.-140° C.

In an embodiment of the invention the pressurised steam is pressurised in the range of 1-7 bar desirably in the range of 2-4 bar.

In an embodiment of the invention it is the same pump that both causes a flow of water through said filter bank, and causes pressure for water and/or steam for backwashing of said filter elements. This is advantageous since the construction of the filter unit is simplified, and the use of energy for making pressure is lowered, which results in a cost efficient and environmental friendly solution.

In an embodiment of the invention the filter unit comprises two filter modules comprising dead end filter elements, and one reverse osmosis unit.

In an embodiment of the invention at least one filter element is made of a sintered material, such as sintered silicon carbide, said filter element comprising a plurality of channels adapted for inlet and/or outlet of water.

Hereby it is possible to achieve a very advantageous trans membrane pressure, and hereby lower the energy consumption during the filtering of impure water. Further it is possible to increase the amount of water passing through the filter element.

In an embodiment of the invention the filter unit comprises vacuum creating means adapted for creation of a flow of water through said filter elements by creating a vacuum on a side of said filter elements, which side being the side on which purified water purified by said filter elements is released by said filter elements.

The impure water is hereby advantageously uniformly distributed at the filter element or filter elements, which decreases the frequency with which the filter element or filter elements has to be cleansed during operation.

In an embodiment of the invention the filter unit comprises pressure creating means adapted for creation of a flow of water through said filter elements by creating a pressure on a side of said filter elements, which side being the side on which impure water is received by said filter elements, and vacuum creating means adapted for creation of a flow of water through said filter elements by creating a vacuum on a side of said filter elements, which side being the side on which purified water purified by said filter elements is released by said filter elements, wherein said filter unit is adapted for shifting between said pressure creating means and said vacuum creating means.

It is hereby possible to achieve the advantages of vacuum as described above, and at the same time avoid occurrence of ice caused by the vacuum created by the vacuum creating means, if the temperature of the water is very low such as e.g. $-2°$ C. In such a case it is possible to create a flow by means of the pressure creating means instead of the vacuum creating means.

In an embodiment of the invention, at least some of the filter modules comprises parallel arranged dead end filter elements comprising a top end, a bottom end and a plurality of substantially parallel arranged channels comprising a first end and a second end, which plurality of substantially parallel arranged channels being separated by walls of permeable material, wherein the end of a first group of said channels are blocked at said top end of said dead end filter element and open at said bottom end of said dead end filter element, and the end of a second group of said channels are blocked at said bottom end of said dead end filter element and open in said top end of said dead end filter element, and wherein said filter unit is configured for providing a fluid flux from the openings of the channels comprising open ends at one of the top end or bottom end said at least one dead end filter element, into the channels, through the walls of permeable material to the channels comprising open ends at the other end of the dead end filter element, and out of the other end of the at least one dead end filter element.

Hereby, it is possible to achieve a very space saving filter unit having an advantageous fluid flux, since the configuration of the above mentioned filter elements facilitates an increased fluid flux through the filter elements at a less amount of space compared to conventional dead end filter elements, due to the feature that the liquid is let through the plurality of channels, and therefrom through the plurality of permable walls.

In an embodiment of the invention the filter unit is used for purifying impure seawater before said seawater is lead into one or more ballast tanks of a sea vessel. Hereby it is possible to ensure that no organic particles, bacteria and the like are taken into the ballast tanks. By filtering the water before it is taken into a ships ballast tanks it is possible to prevent unintentional changes in the sea environment and ecology caused by transport of impure ballast water.

In an embodiment of the invention the filter unit is used for at least partly purifying water into drinking water. Hereby it is possible to achieve pure drinking water in a cost efficient way. Further it is possible to obtain drinking water in an easy and environmental friendly way.

It is noted that it in an embodiment of the invention could be possible to use the unit for at least partly purifying water into drinking water, and for water for ballast tanks. E.g. water for use in ballast tanks is obtained and led into the ballast tanks before it reaches the filters for at least partly purifying water into drinking water (e.g. reverse osmosis or forward osmosis), and some water is at least partly purified water into drinking water.

In an embodiment of the invention the filter unit is used for purifying recirculating chlorinated water such as pool water.

A filtration unit according to the invention further gives the possibility of saving a considerably amount of space compared to e.g. sand filters, and at the same time the filter unit according to the invention consumes only about ⅙ or even less power than the power consumed by a sand filter, or about ¼ or even less power than of the power consumed by a traditional membrane filter.

It is commonly known to add flocculation chemicals into the impure water, to clump the solids in water through biological or chemical action, so they can be separated from the water However this flocculation suffers from the disadvantage that the flocculation chemicals and/or the clumped solids sticks onto the filter means, especially if the filter elements. By using a filtration unit according to the invention it is possible to add flocculation chemicals into the water without risking that the filter means are clogged by the flocculation chemicals and/or the sorted out material.

Further the filter unit according to the invention can be build to be resistant to high temperatures (e.g. up to 2000° C.) and at the same time it is resistant to chemicals with varying pH values from a pH value at 1 to a pH value at 14. A filter unit according to the invention further facilitates durability several times longer than ordinary filter units.

It is to be generally understood that during backwashing/flushing of the filter elements in the de-gassing version of the filter unit, as well as in aspects of the invention not comprising the de-gassing version, ozone may be applied to the water, steam and/or air for backwashing, to release and/or remove fats, organic material and the like.

BRIEF DESCRIPTION OF THE FIGURES

The invention will be explained in further detail below with reference to the figures of which FIG. 5a-5i shows an embodiment of a dead end filter elements with channels blocked at one end of the dead end filter element, and channels with blockings at the other end of the filter elements.

DETAILED DESCRIPTION

Figure 1:
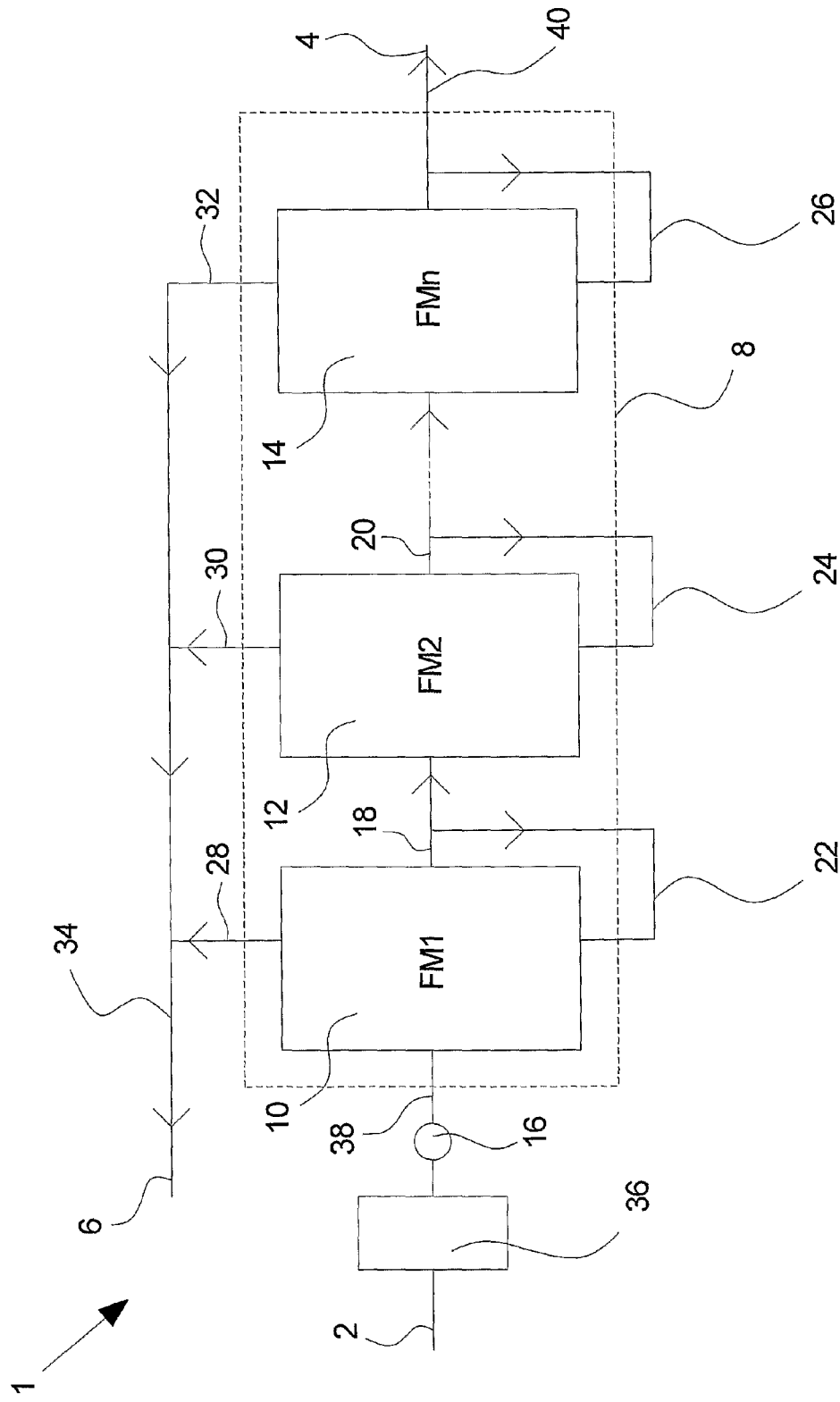
FIG. 1 shows a filter unit according to the invention.

FIG. 1 shows an embodiment of a filter unit 1 according to the invention. The filter unit 1 comprises at least one inlet 2 for impure water to be purified, at least one outlet for impure water from backwash 6, at least one outlet for filtered water 4 and means for supplying impure water to said filter bank, e.g. a pump 16. The filter unit 1 further comprises at least one filter bank 8 comprising a first filter module 10 (FM1) and one or more additional filter modules (FM2-FMn) 12, 14. It is understood that the filter bank could comprise a plurality of additional filter modules such as three, four, five, seven, ten or even more filter modules.

The filter modules (FM1-FMn) 10, 12, 14, which are serially arranged, comprises filter means with decreasing pore size i.e. the filter module 12 comprises filter means with pore sizes smaller than the pore size of the filter means of the filter module 10, the filter module 14 comprises filter means with pore sizes smaller than the pore size of the filter means of the filter module 12, etc. The filter means of the serially arranged filter modules 10, 12, 14 comprises at least two parallel arranged filter elements, which is not illustrated in FIG. 1.

The filter unit according to the invention could be used for cleansing of seawater, seawater intended for use as ballast water, ballast water, waste water, water from rivers, recirculating chlorinated pool water, water from lakes or the like.

The filter unit 1 further comprises water transportation means for transporting water from one filter module to another 18, 20, water transportation means for transporting water for backwashing of the filter means of the filter modules 22, 24, 26, water transportation means for transporting impure water from backwashing 28, 30, 32, 34 and the like. Likewise the filter unit comprise means for transportation of water into the first filter module 38, and means for transporting water to the at least one outlet 4.

When filtered water is exiting the serially arranged filter modules 10, 12, 14 by means of the transportation means 18, 20 and/or the means for transporting water to the at least one outlet 4, the exiting water does not contain materials which can clog the filter means of the module which the filtered water is leaving.

In an exemplary embodiment of the invention, backwashing is performed by at least a part of the filtered water which has been filtered and forwarded by the filter module comprising filter means which is intended for backwashing, and previous filter modules comprising filter elements with a larger pore size than the filter element or filter elements that are backwashed. For example water exiting the filter module 12 through the transportation means 20, and through the transportation means for transporting water for backwashing 24 is used for backwashing of the filter means of the filter module 12. Filtrated water from filter modules succeeding the filter module 12 (in FIG. 1 the filter module FMn) is not used for backwashing of the filter module 12.

The filter unit in FIG. 1 also comprises at least one additional filter 36 for sorting out coarse materials. The additional filter 36 is advantageous in relation to sorting out coarse material from e.g. a basin/dock, a swimming pool or the like. Such coarse material could be planks, plastic cans, seaweed, hair, paper and the like. It is noted that the additional filter 36 could comprise a stepwise filtering with filter elements of different pore size.

Figure 2:
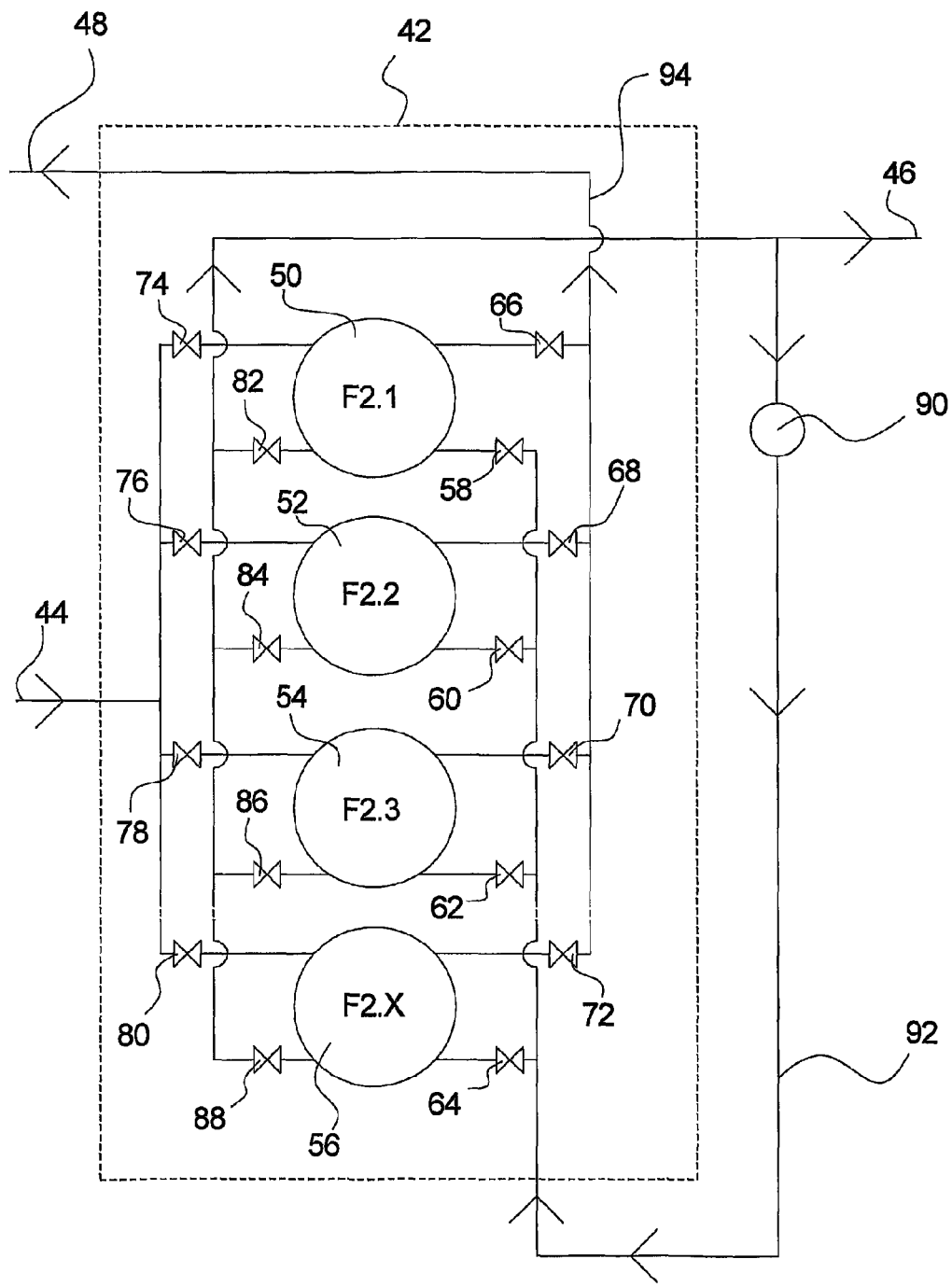
FIG. 2 shows a filter module according to an embodiment of the invention.

FIG. 2 shows a single filter module 42 of the filter unit (not shown in FIG. 2) comprising an inlet 44 for water to be filtered, and an outlet 46 for filtered water filtered by the filter module 42.

The filter module 42 further comprises filter means comprising filter elements (F2.1, F2.2, F2.3, F2.X) 50, 52, 54, 56, and an outlet 48 for water used for backwash of the filter elements (F2.1, F2.2, F2.3, F2.X) 50, 52, 54, 56 of the filter module 42. It is understood that the filter means could comprise a plurality of filter elements such as two, three, four, eight, ten, fourteen, sixteen, twenty or even more filter elements such as twenty-eight, thirty, thirty-six or even more filter elements.

In an embodiment of the invention each of the filter elements (F2.1, F2.2, F2.3, F2.X) 50, 52, 54, 56 are substantial cylindrical filter elements with a diameter between 10 mm to 1000 mm, desirably in the interval between 90 mm-350 mm However the filter elements could likewise be filter elements of other geometrical forms or shapes such as hexagon shaped, pentagon shaped, triangular shaped, rectangular shaped or the like, each with a surface area between 70 $mm^2$ and 800000 $mm^2$, desirably between 5000 $mm^2$ and 100000 $mm^2$. It is to be understood that a filter module could comprise filter element of different sizes, forms and/or shapes. The pore size of the filter elements could vary anywhere between 500 mm to 0.001 μm. such as e.g. 20 mm, 2 mm, 0.2 mm, 0.02 mm, 2 μm, 0.2 μm, 0.02 μm, 0.03 μm, 0.003 μm or the like.

In an embodiment of the invention the pore sizes of the filter elements of a filter module are at least, ten times smaller, twenty times smaller 100 times smaller, 1000 times smaller, 10000 times smaller, 20000 times smaller or the like, than the filter elements of the previous filter module. As an example, if the filter elements of the filter module 42 has a pore size of approximately 30 μm, the following filter module could comprise filter elements with pore sizes of approximately 0.03 μm, and the previous filter module could comprise filter elements with a pore size of approximately 3 mm.

In an exemplary embodiment of the invention the filter bank comprises at least one filter module comprising dead end filter elements. It should be understood that the filter bank in an embodiment could comprise filter modules comprising other types of filter elements such as membrane filters, cross flow filters, wedge wire filters, wire mesh filters or any other suitable filter means. These filter means could e.g. be use for pre-filtrating the impure water, for sorting our coarse materials or the like.

In an exemplary embodiment at least one of the filter modules of the filter unit comprises filter elements made of a sintered material. Such sintered material could e.g. be sintered silicon carbide, sintered ceramics, sintered polymer, sintered metal such as sintered bronze, sintered brass, sintered stainless steel or the like, sintered carbon, sintered glass or the like.

The filter module 42 further comprises a number of flow controlling means suitable for controlling the flow through the filter elements (F2.1, F2.2, F2.3, F2.X) 50, 52, 54, 56. These flow controlling means are the backwash inlet means 58, 60, 62, 64, the backwash outlet means 66, 68, 70, 72, the filter element inlet means 74, 76, 78, 80 and the filter element outlet means 82, 84, 86, 88. The flow controlling means are in an exemplary embodiment of the invention valves. These valves could be valves capable of varying the flow through the valve at any point between 0% and 100% to be capable of control pressure as well as flow by varying the opening of the valve, but it could also be valves capable of opening at either 0% or 100%. It is noted that even if valves are desirable as flow controlling means, suitable means capable varying a flow of liquid, known to a person skilled in the art could be relevant as flow controlling means.

By opening or closing the flow controlling means it is possible to obtain selective backwashing of some filter elements, while other filter elements are filtering water led through the inlet 44 for the filter module 42. An example of such backwashing is described in the following example in which the filter element 52 (F2.2) is backwashed while the other filter elements are filtering water from the inlet 44.

The backwash inlet means 58, 62, 64 are kept closed together with the backwash outlet means 66, 70, 72. Likewise the filter element inlet means 74, 78, 80 are opened together with the filter element outlet means 82, 86, 88. The backwash outlet means 68 and the backwash inlet means 60 are opened and the filter element inlet means 76 and the filter element outlet means 84 are closed. When the pump suitable for creating a backwash flow 90 is activated, a flow of water filtered by the filter module 42 is led through the water transportation means for transporting water for backwashing 92, through the now opened filter backwash inlet means 60 to backwash the filter element 52, and out through the water transportation means for water from backwashing 94 towards the outlet 48. At the same time water for filtration is led through the inlet 44 for the filter module 44, through the opened filter element inlet means 74, 78, 80, through the filter elements 50, 54, 56, and out through the filter element outlet means 82, 86, 88. Hereby the water is filtered by the filter elements 50, 54, 56 (F2.1, F2.3, F2.X) at the same time as the filter element 52 (F2.2) is getting backwashed and hereby cleansed. It should be understood that backwashing could be performed on multiple filter elements of a filter module at the same time as other filter elements are filtering water.

In an exemplary embodiment of the invention, backwash is alternating performed on all filter elements of a filter module, while the remaining filter elements of the filter module are filtering water. It is likewise understood that backwashing in an embodiment of the invention could be performed on multiple filter elements of multiple filter modules at the same time, while filtration of impure water is still performed. Likewise a flow controlling mans could be controlling to a group of filter elements e.g. while other flow controlling means is used solely for facilitating cut off of a water flow during service, maintenance or replacement of one or more filter elements.

The backwashing could be performed by means of pressurized water which in an embodiment of the invention could be heated. The pressurized water could be added chemicals for cleaning the filter elements. A further cleansing could in an embodiment of the invention be performed by means of pressurised steam. The pressurised steam could be generated by means of the water forwarded from the filter elements filter module or filter modules of which the backwash is intended. The pressurised steam has a temperature 100° C.-200° C., such as between 120° C.-150° C., desirably in the interval 125° C.-140° C. The steam temperature is obtained by pressurising and heating water until the desired steam temperature or pressure is obtained. The filter unit could in an embodiment of the invention comprise means for creating pressurized steam, and the water used for creating the pressurized steam could be the water purified by the filter unit.

In an embodiment of the invention backwashing is performed both by means of pressurized water and pressurised steam.

Figure 3:
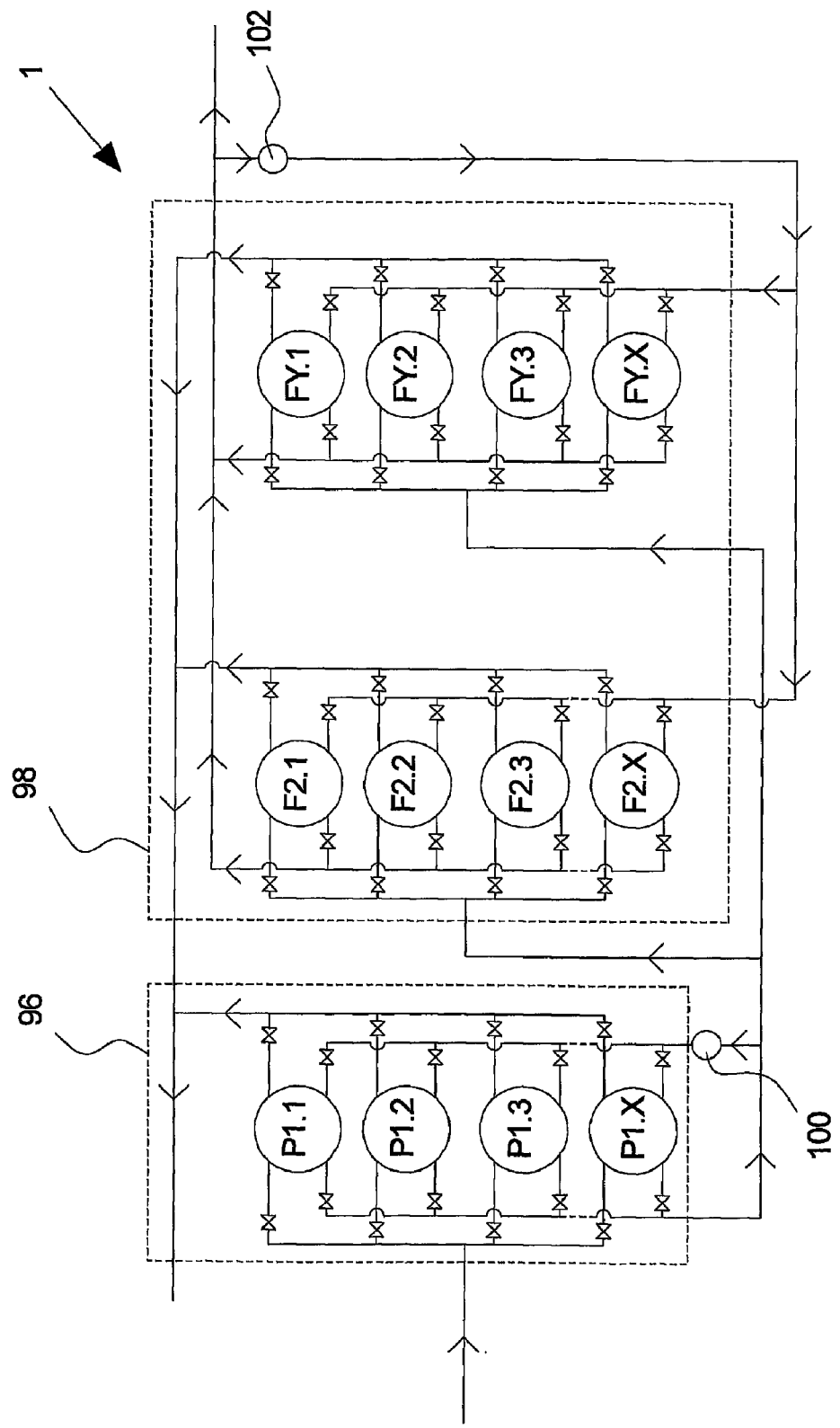
FIG. 3 shows a detailed view of a filter unit according to an embodiment of the invention.

FIG. 3 shows a more detailed view of a filter unit 1 according an embodiment of the invention, comprising two serially connected filter modules 96 and 98. The first filter module 96 comprises parallel arranged filter elements P1.1, P1.2, P1.3 and P1.X. As illustrated the filter module 96 could comprise a plurality of filter elements. The filter module 98 comprises parallel arranged filter elements F2.1, F2.2, F2.3, F2.x, FY.1, FY.2, FY.3 and FY.X. In this invention the filter module 96 is intended for pre-filtration, and the filter module 98 is intended for further purification of the pre-filtrated water. It should be understood that the filter unit could comprise a plurality of filter modules for pre-filtration, a plurality of filter modules for further filtration, and/or filters for sorting out coarse materials As illustrated the filter module 98 could likewise comprise a plurality of filter elements. The pump 100 is capable of creating a backwash flow for the filter elements P1.1, P1.2, P1.3, P1.X, and the pump 102 is capable of creating a backwash flow for the filter elements F2.1, F2.2, F2.3, F2.x, FY.1, FY.2, FY.3, FY.X. Hereby it is possible to achieve a selective backwashing, of the different filter elements of the filter modules 96 and 98.

If the water filtered by the filter unit 1 is e.g. impure seawater intended for drinking water, it is desirable that at least one of the filter modules of the filter unit comprises filter means which is a reverse osmosis filter, or other filter means comprising at least one semipermeable membrane for desalination of the seawater and removal of other particles known to a person skilled in the art. A reverse osmosis unit could likewise be used for purify fresh water for other medical, industrial or domestic applications.

In an embodiment of the invention the filter modules of the filter unit 1 comprise filter modules with a varying number of filter elements, determined by the pore size of the filter elements.

In an embodiment of the invention the filter modules and/or the filter elements of the filter modules are replaceable, and could be made of prefabricated standard components.

Figure 4:
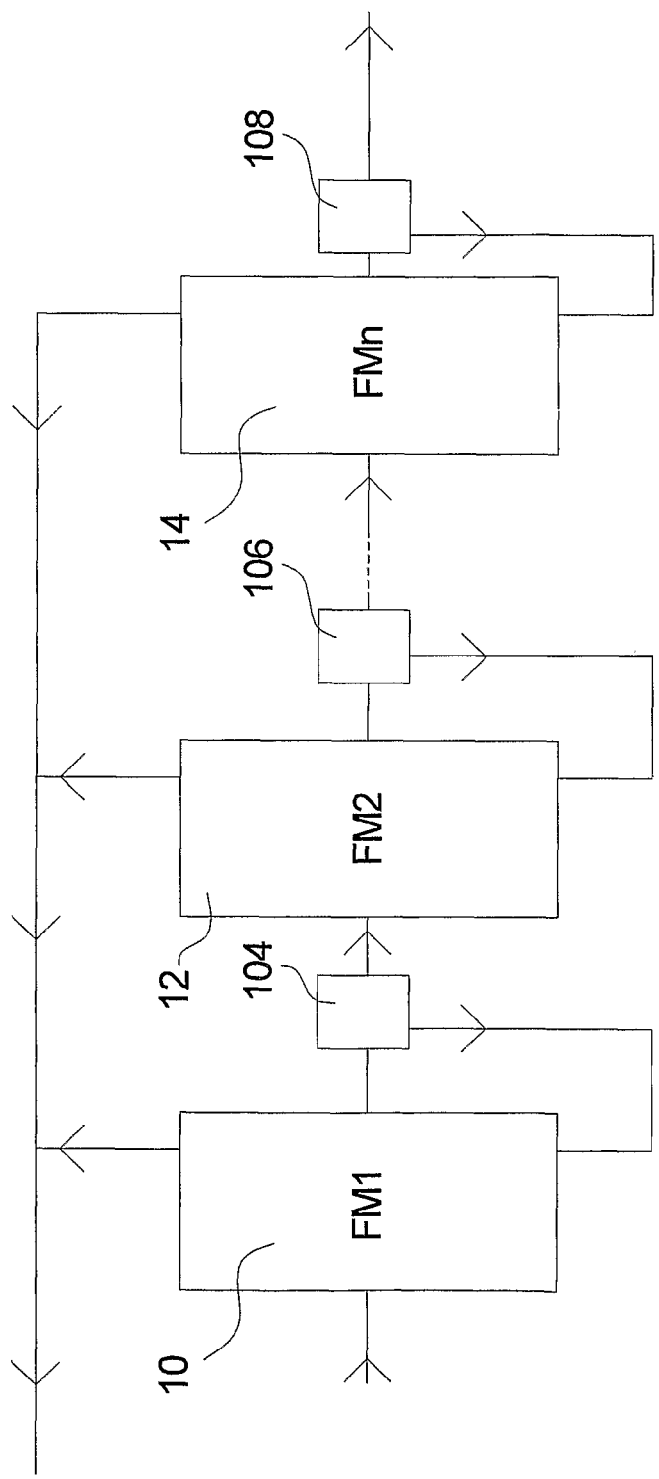
FIG. 4 shows another embodiment of a filter unit according to the invention.

FIG. 4 illustrates an embodiment of the invention wherein the filter unit comprises compartments 104, 106, 108 after each filter module 10, 12, 14 to facilitate a buffer function. These compartments comprise filtered water filtered by the previous filter modules.

In an embodiment of the invention one or more filter modules and/or one or more filter elements comprises compartments for storage of filtered water to facilitate a buffer function.

Figure 5:
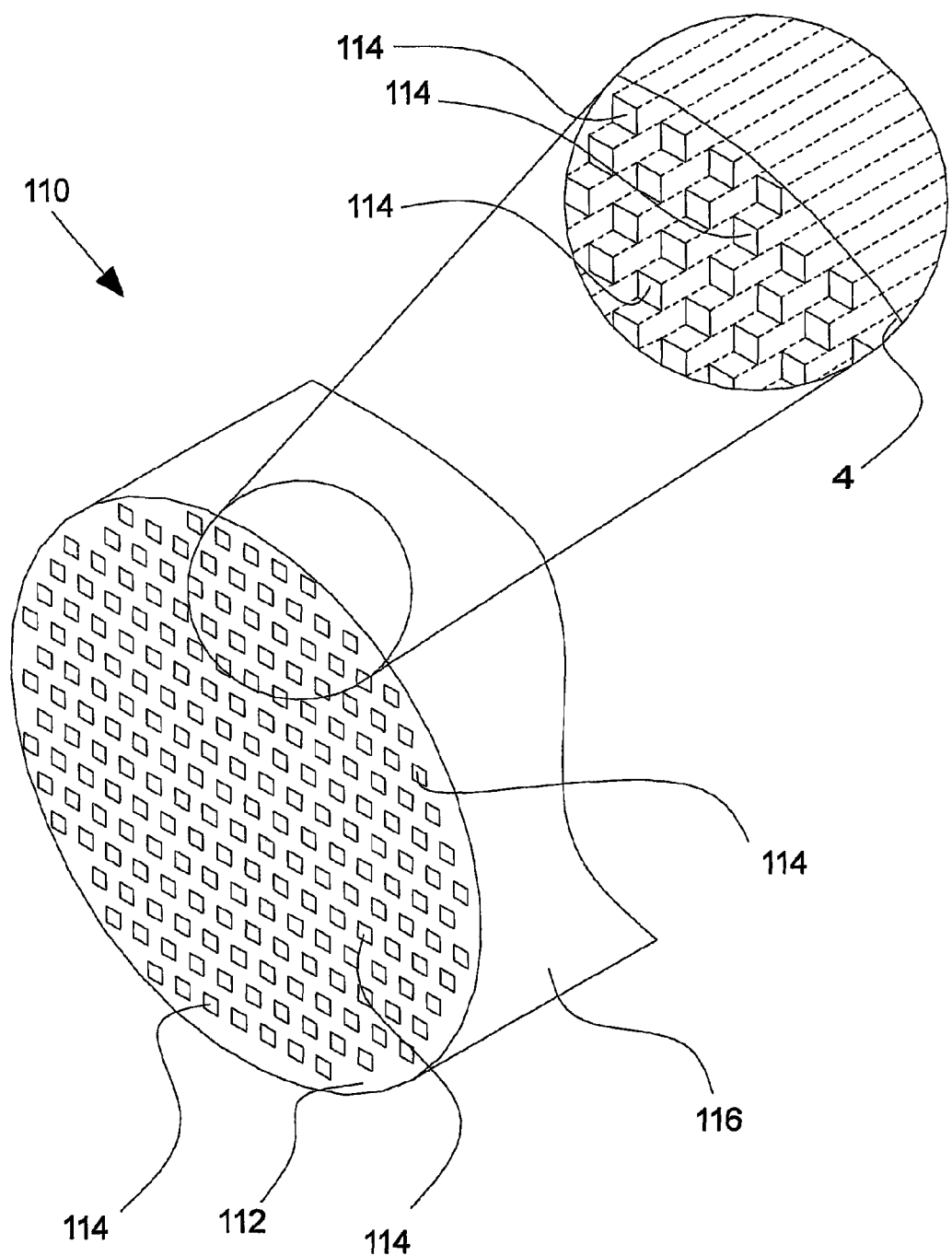
FIG. 5 shows an embodiment of a filter element made of a sintered material.

FIG. 5 shows an embodiment of a filter element 110 used in the filter unit according to the invention. The filter element 110, which is made of a sintered material 112, desirably sintered silicon carbide, comprises a plurality of channels 114 for inlet of impure water. The impure water is let through the filter element 110 by means of vacuum creating means and/or pressure creating means. The channels 114 in this embodiment are rectangular shaped as illustrated in FIG. 5, which facilitates the possibility of packing the channels 114 close together and give a more uniform thickness of the filter walls between the channels 114. However the channels 114 could also be circular shaped, triangular shaped, pentagonal shaped, hexagonal shaped or other geometrical shapes as well as a combination of such geometrical shapes. The filter element 110 in this embodiment is arranged with thoroughgoing channels 114 in the filter element 110, but the channels 114 could also be holes which are not thoroughgoing. The impure water is in an exemplary embodiment of the invention let through the channels 114, filtered through the sintered material 112 of the filter element 110, and the filtered water is released and forwarded through the outer surface 116 of the filter element 110. In another embodiment the impure water is led through the outer surface 116 of the filter element 110, and the filtered water is released through the walls of the plurality of channels 114. It is noted that the filter element could take multiple forms such as cylindrical (as illustrated in FIG. 5) but it could also be triangular, pentagonal, hexagonal or other geometrical shapes as well as a combination of such shapes as described earlier.

Figure 5A:
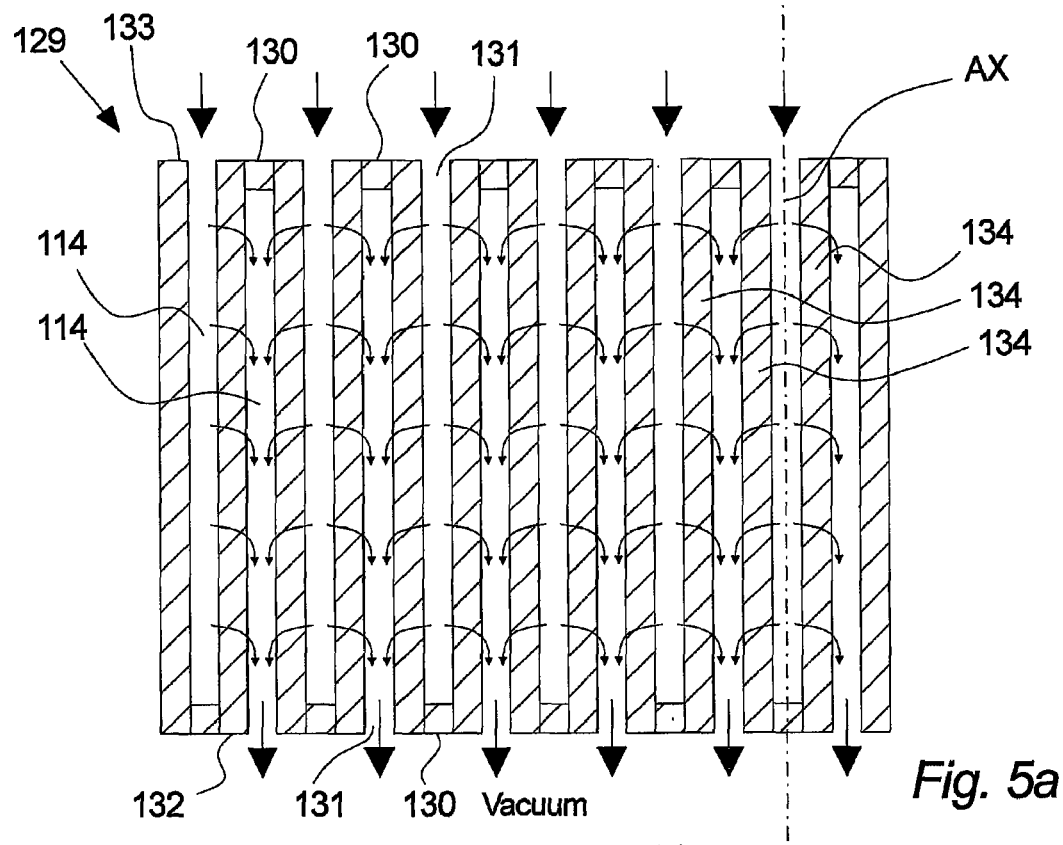
Figure 5B:
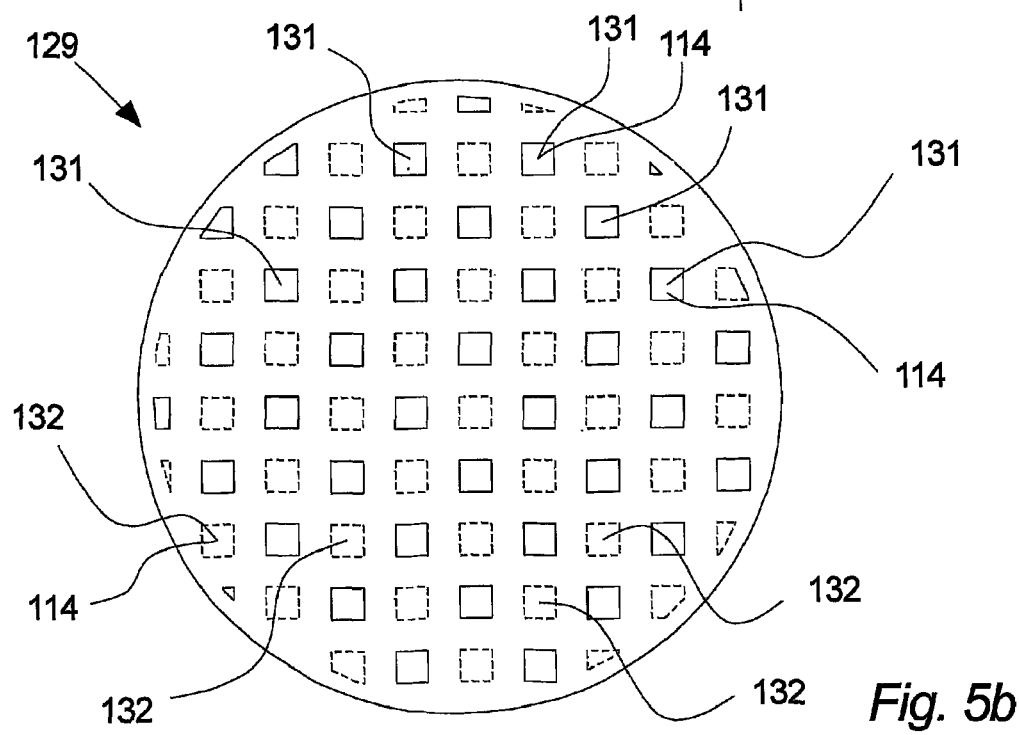

FIG. 5a shows a filter element 129, made from a permeable material such as sintered silicon carbide, but it could also be made of another permeable material such as another ceramic material, another sintered material or the like. The filter element 129 comprises a bottom end 132 (which also may be referred to as "bottom"), a top end 133 (which also may be referred to as "top") and a plurality of substantial parallel arranged channels 114 which extend in the longitudinal direction but are not thoroughgoing, i.e. each channel 114 comprises a blocked end 130 at the one end of the channels and an open end 131 at the other end of the channels 114. One group of the channels 114 are blocked at the top 133 end, and the other part of the channels 114 are blocked at the bottom end of the filter element 129 as illustrated at FIGS. 5a and 5b, hereby obtaining a dead end filter element as illustrated.

Figure 5C:
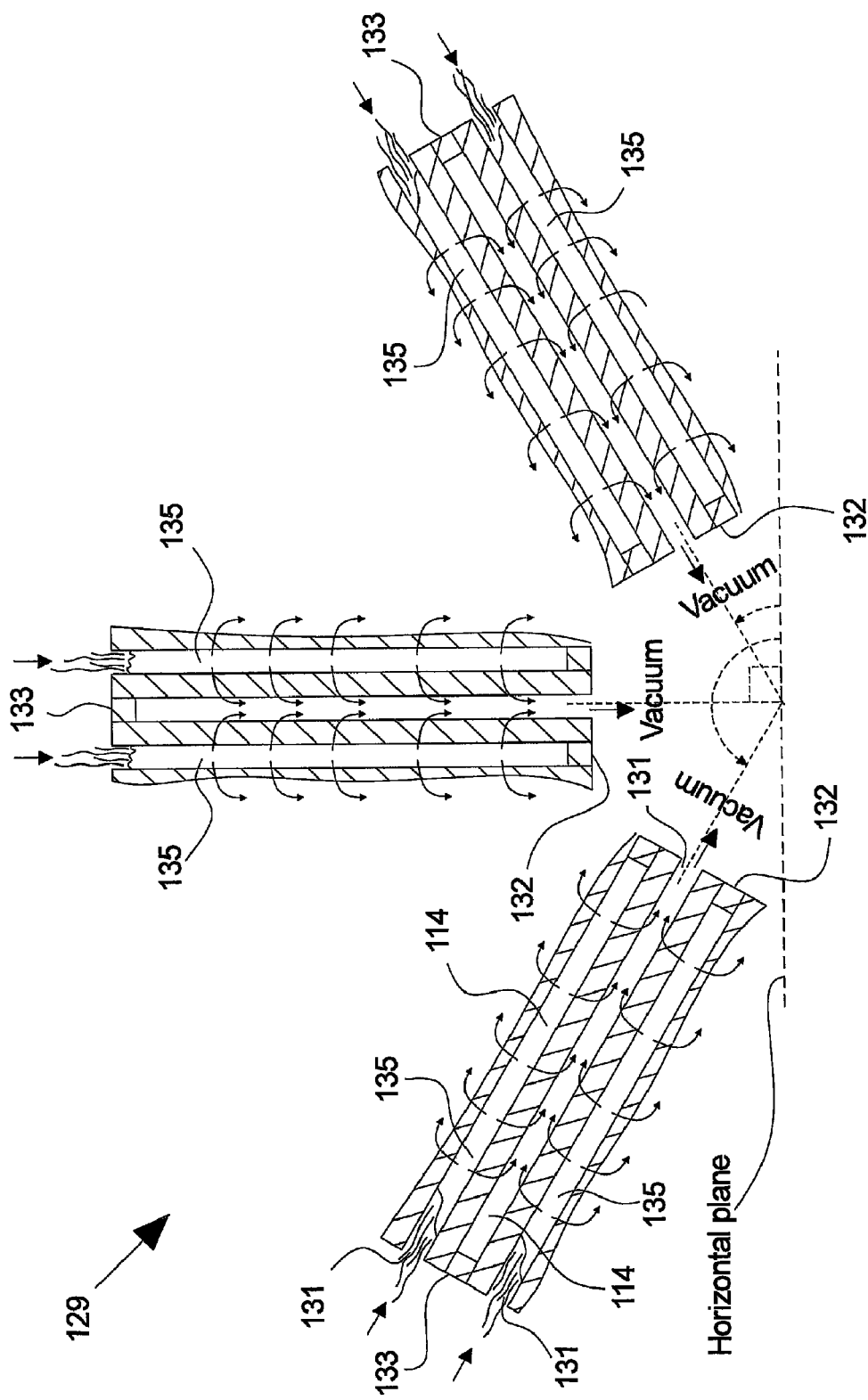

The dead end filter element 129 is arranged so that the longitudinal axis (AX) of said channels are fixed at an angle between 0° and 180° such as between 30° and 150°, desirably between 60° and 120° such as around 90° compared to horizontal, as illustrated in FIG. 5c. A fluid flux is created through the filter element by applying a vacuum pressure at the bottom end 132 of the filter element 129. Hereby water is let through the open ends 131 of the channels 114 at the top end 133 of the filter element 129, through the permeable walls 134 between the channels 114 thereby being filtered, and is let out by the open ends 131 at the bottom end 132 of the filter element 129.

The dead end filter elements 129 may be used for cleansing/purification of recirculating chlorinated water in swimming pools, water parks or the like, for water for ballast tanks, for purification of slurry, for removal of silt from water, for drinking water or the like. If the filter elements 129 are used for production of drinking water they could desirably be used for pre-filtration of water before it is led to reverse osmosis filters.

By arranging the filter element 129 as described above so that the flow is downwards in the direction of gravity, gasses released from the water during the filtration will not block the channels of the filter element as the gasses will move upward away from the filter and out through outlet means. By furthermore applying a vacuum at the bottom end 132 of the filter element 129, the filter element 129 facilitates increased releasing of gasses, in particular of harmful gasses from the water through the open ends 131 of the channels 114 at the top end 133 of the filter element 129. This increased releasing of harmful gasses is caused by the lowered boiling point of water during vacuum, and the lowered solubility of gasses in the water during vacuum. Such harmful gasses may e.g. be THM (Trihalomethans), AOX (Adsorbable Organic Halogens) and chloramines, which are hard to remove from chlorinated water from e.g. swimming pools or water parks by means of filtering with conventional filter systems, and which are harmful to people and the environment. Likewise the dead end filter element 129 facilitates an increased amount of fluid flux through the filter element 129 compared to conventional dead end filters such as e.g. conventional membrane filters, since the plurality of channels gives an increased surface for filtering liquid compared to the size of the filter element 129, hereby facilitating an improved trans membrane pressure and at the same time keep an advantageous flux through the filter element 129.

The pore sizes of the filter elements 129 is between 2 mm and 0.001, e.g. between 20 μm and 0.03 μm, such as between 15 μm and 0.04 μm, which is especially advantageous in relation to filtering chlorinated water, water into drinking water, or the like.

Although applying a vacuum pressure at the bottom end 132 of the filter element 129 is desirable, it is understood that in an embodiment of the invention pressure means may be used to obtain a fluid flux instead of vacuum means, or both vacuum and pressure means may be omitted and the fluid flux is created solely by means of the gravity. This embodiment is especially advantageous if the filter unit comprises serially arranged filter modules comprising a plurality of parallel arranged filter elements 129, e.g. as in a filter unit as described earlier or in relation to FIG. 5j, since the filter unit hereby facilitates an advantageous fluid flux and at the same time is very energy-efficient.

Figure 5H:
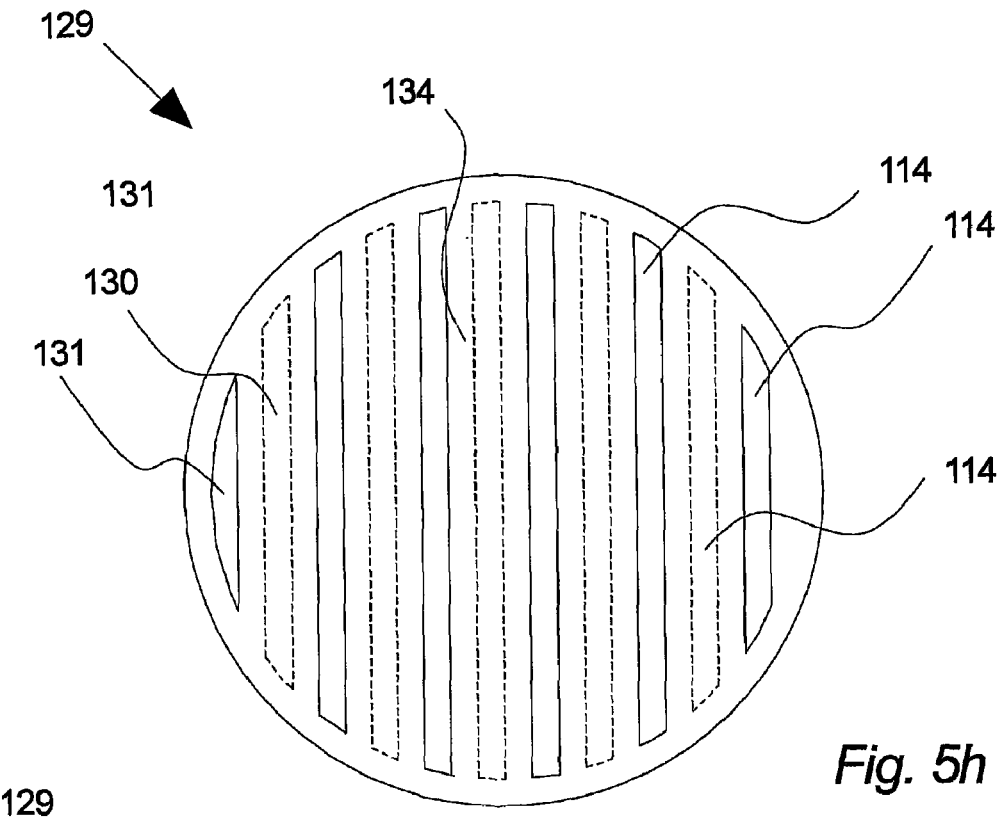
Figure 5I:
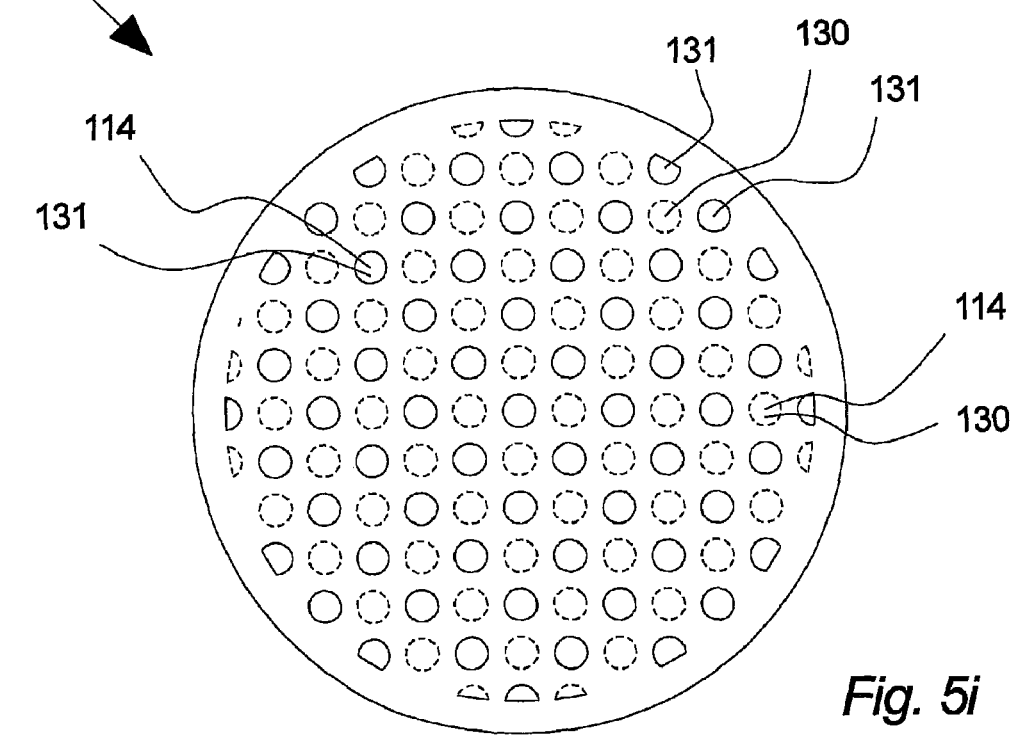

The blocking of the ends of the channels 114 could be arranged alternating as illustrated in FIG. 5b (illustrated by the dashed-line channels). The blockings (and openings) of the ends of the channels 114 could also be arranged in other patterns that allow an advantageous filtering of the water, e.g. to accomplish an increased fluid flux, evaporation of gases, or the like. Likewise the cross-section of the channels 114 could be circular shaped (as illustrated in FIG. 5i), triangular shaped, pentagonal shaped, hexagonal shaped (as illustrated in FIG. 5d), rectangular shaped (as illustrated in FIG. 5b or 5h) or other suitable geometrical shapes, e.g. as illustrated in FIG. 5e.

FIG. 5d illustrates one end of a filter element 129 with a plurality of hexagonally shaped channels 114 as seen in cross-section to obtain an equal width of the walls between the channels, where the dashed-line channels 114 are the channels 114 with blocked ends 130 of the channels 114 in the illustrated end of the filter element 110. As illustrated in FIG. 5d, the ratio of channels 114 with a blocking at one end of the dead end filter element 129, and channels 114 with blocking at the other end of the filter element 129 is not necessarily divided with the proportion 50/50 (meaning 50% of the channels 114 has a blocking in one end of the filter element 129, and the other 50% of the channels 114 has a blocking in the other end of the filter element 129) as illustrated in FIGS. 5a and 5b. The ratio of channels 114 with a blocking at one end of the filter element 129, and channels 114 with blocking at the other end of the filter element 129 could also be divided with another proportion as illustrated in FIG. 5d, such as e.g. 10/90, 40/60, 30/70 or the like.

FIG. 5e-g illustrates another layout of the channels 114 in the filter element 129, where the channels 114 are of an annular shape. Likewise FIGS. 5h and 5i illustrates other embodiments of the layout of the channels 114 in a filter element 129. It is understood that the shape of the channels 114, the number of channels 114 and the proportion between channels 114 with blocking in one end of the filter element 129, and channels with blocking in the other end of the filter element 129, is not limited to the shapes numbers and/or proportions explained, but could comprise any suitable proportion, number and/or shape.

It is understood that the filter elements described according to the FIGS. 5a-5i advantageously could be used as filter means/filter elements described in any of the previous described embodiments of a filter unit 1 according to the invention, as well as in following embodiments of the invention, and facilitate alternating backwash, cleansing and the like as explained.

Figure 5J:
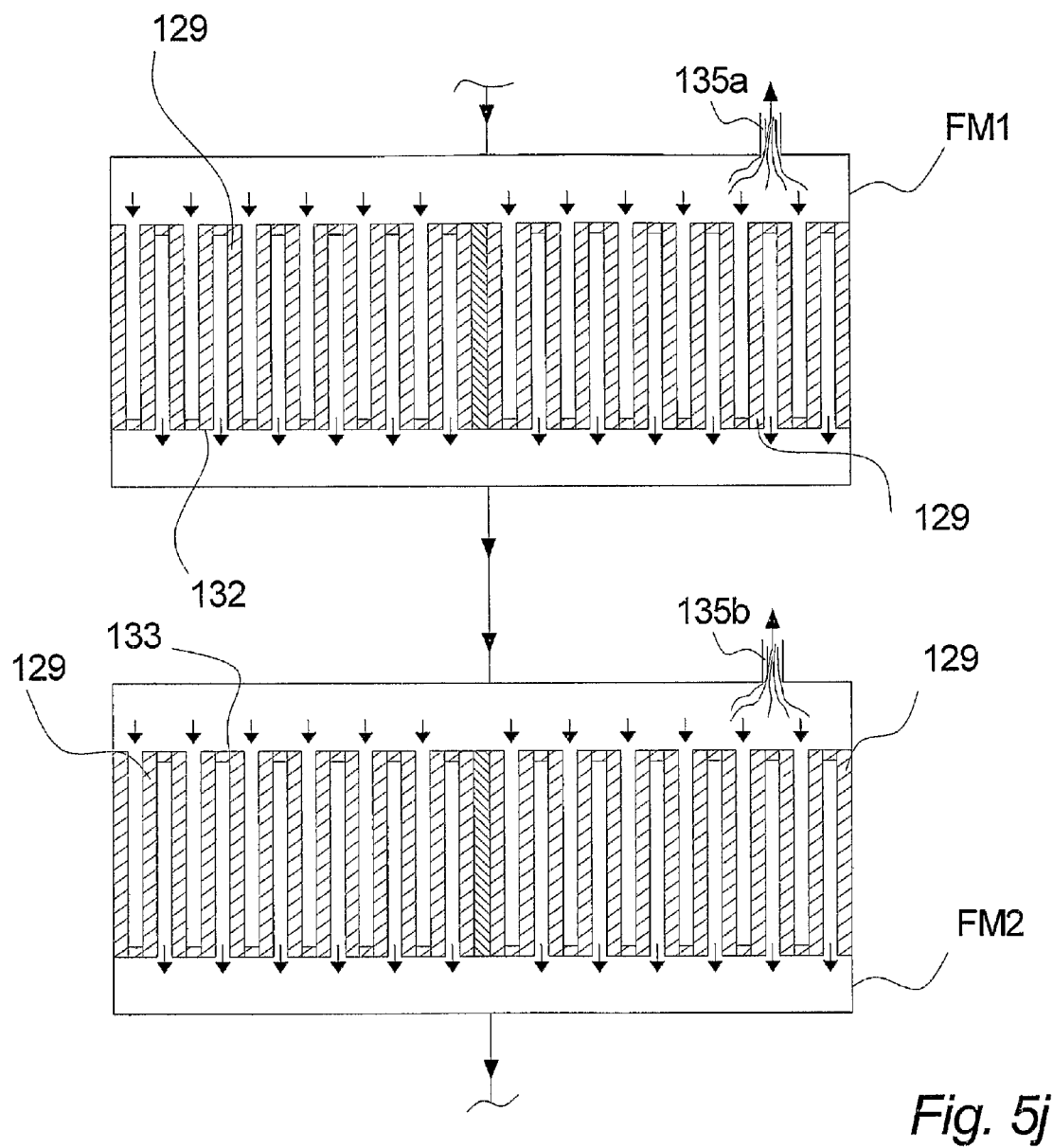
FIG. 5j shows a filter bank of a filter unit, comprising filter elements according to FIG. 5a-5i, FIG. 6a-c show different embodiments of means for creating a flow through the filter elements.

An example of the use of the filter elements of FIG. 5a-5i in serially arranged filter modules of a filter unit 1 is shown in FIG. 5j. The filter unit 1 (not illustrated in FIG. 5j) comprises a filter bank with at least two serially arranged filter modules FM1, FM2 comprising a plurality of parallel arranged filter elements 129. The filtered water from the outlet in the bottom end 132 of the filter elements 129 is let, desirably by means of vacuum, from a first filter module FM1 into the inlets at the end of the filter elements 129 in a second subsequent filter module FM2 comprising similar filter elements 129 with a smaller pore size than the previous filter module FM1. The filter modules FM1, FM2 in FIG. 5*j* comprises two parallel arranged filter elements 129, but it is understood that the filter modules could comprise a plurality of filter elements 129 as described earlier. Hereby an increased releasing of harmful gasses is achieved, since the gasses released between the filter modules may be released at the second filter modules, or at other suitable locations.

The filter modules FM1 and FM2 in FIG. 5*j* comprise controllable gas outlet means 135*a*, 135*b* such as e.g. vent controlled openings or any other suitable means for control flow of gasses, for releasing harmful gas released from the water. The gas outlet means may in another embodiment of the invention be arranged in a special tank (not illustrated) adapted to collect released gasses from the water, or at any suitable location in the filter unit 1. The gas outlet means 135*b* in FIG. 5*j* releases the gas released from the water between the filter modules FM1 and FM2 and released by the open ends 131 of the channels 114 at the top end 133 of the filter elements 129 in the filter module FM2.

The gas outlet means may be controllable vent means to facilitate releasing of the gasses with a given desired time, the gas outlet means may be adapted to release gasses when a predefined amount of gasses is released from the water, when actuated by a user or the like, or the gas outlet means may also be adapted to continuously release gas released from the water.

A vacuum applied to the bottom of the filter elements 129 may desirably be applied at the outlet of the filter module FM2 to apply a vacuum on both filter module FM1 and FM2, but in another embodiment of the invention a vacuum is applied between the filter modules FM1 and FM2 (causing a vacuum at the bottom ends of the filter elements in filter module FM1 and a pressure at the top end of the filter modules FM2), or at any other suitable location in the filter unit.

Figure 6A:
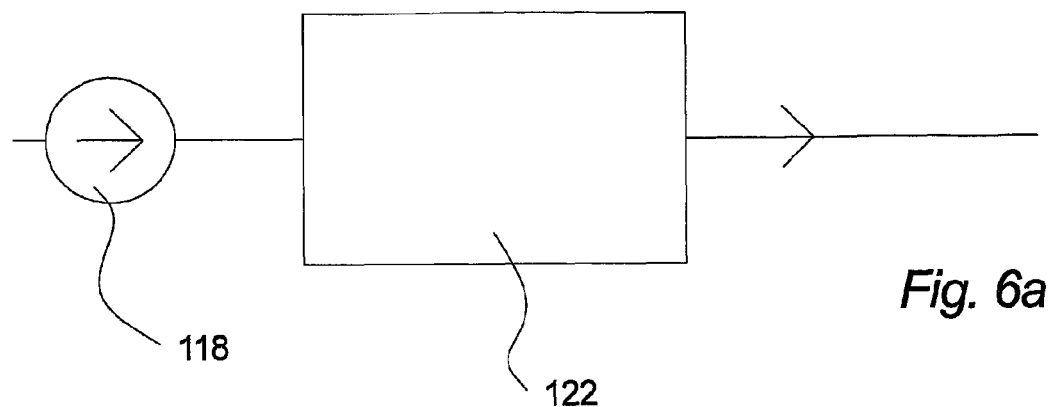

FIG. 6*a* shows pressure creating means 118 for creating a flow through the filter elements of a filter module 122.

Figure 6B:
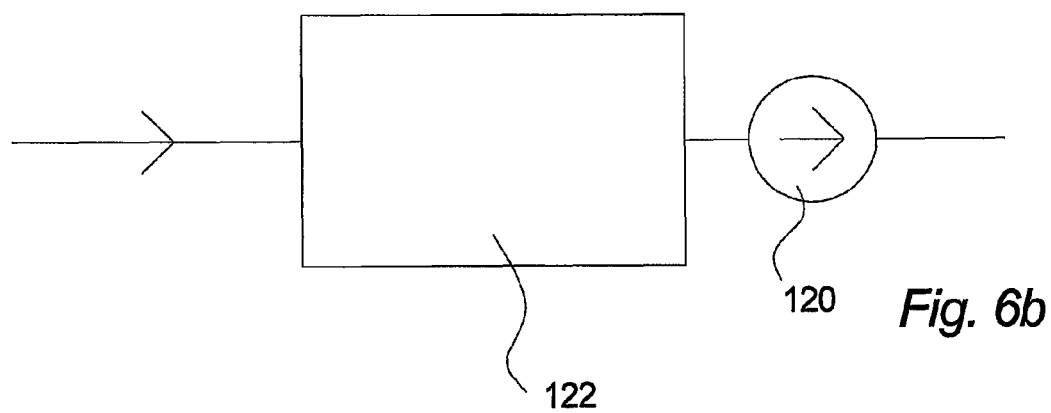

FIG. 6*b* shows vacuum creating means 120 for creating a flow through the filter elements of one or more filter modules 122.

Figure 6C:
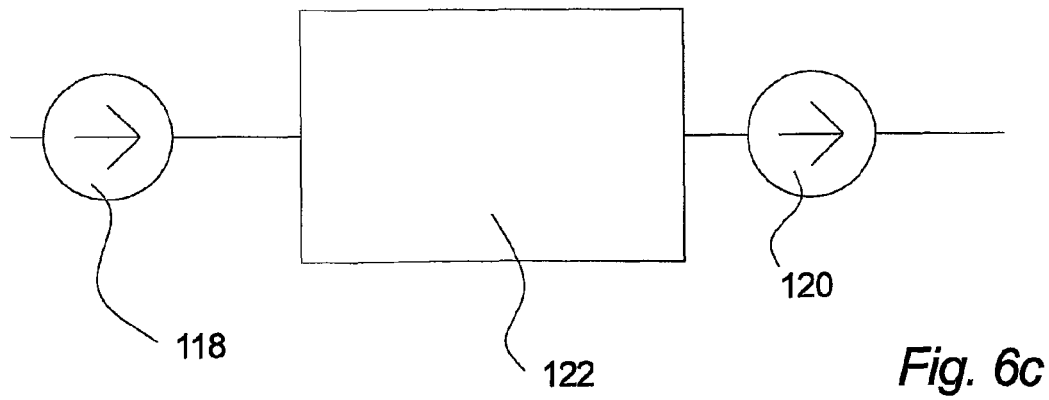

FIG. 6*c* shows an embodiment of the invention where the filter unit (not shown in FIG. 6*a*-*c*) comprises pressure creating means 118 and vacuum creating means 120 for creating a flow through the filter elements of one or more filter modules 122. It is hereby possible to shift between a flow of water through filter elements of one or more filter modules, generated by means of pressure creating means 118, or by means of vacuum creating means 120. E.g. in normal operation the filter unit operates with vacuum creating means for creating a flow, but when the temperature of the water gets below a predefined temperature (e.g. one or two degrees above the freezing point of the water), the filter units shifts to generate a flow through the filter elements by means of pressure creating means 118 to prevent creation of ice.

It is understood that the filter unit could comprise a plurality of vacuum creating means 120 and/or pressure creating means 118, e.g. one for each filter module, one for every second filter module, one for each filter element, one for all filter elements in the filter unit, or the like.

Figure 7:
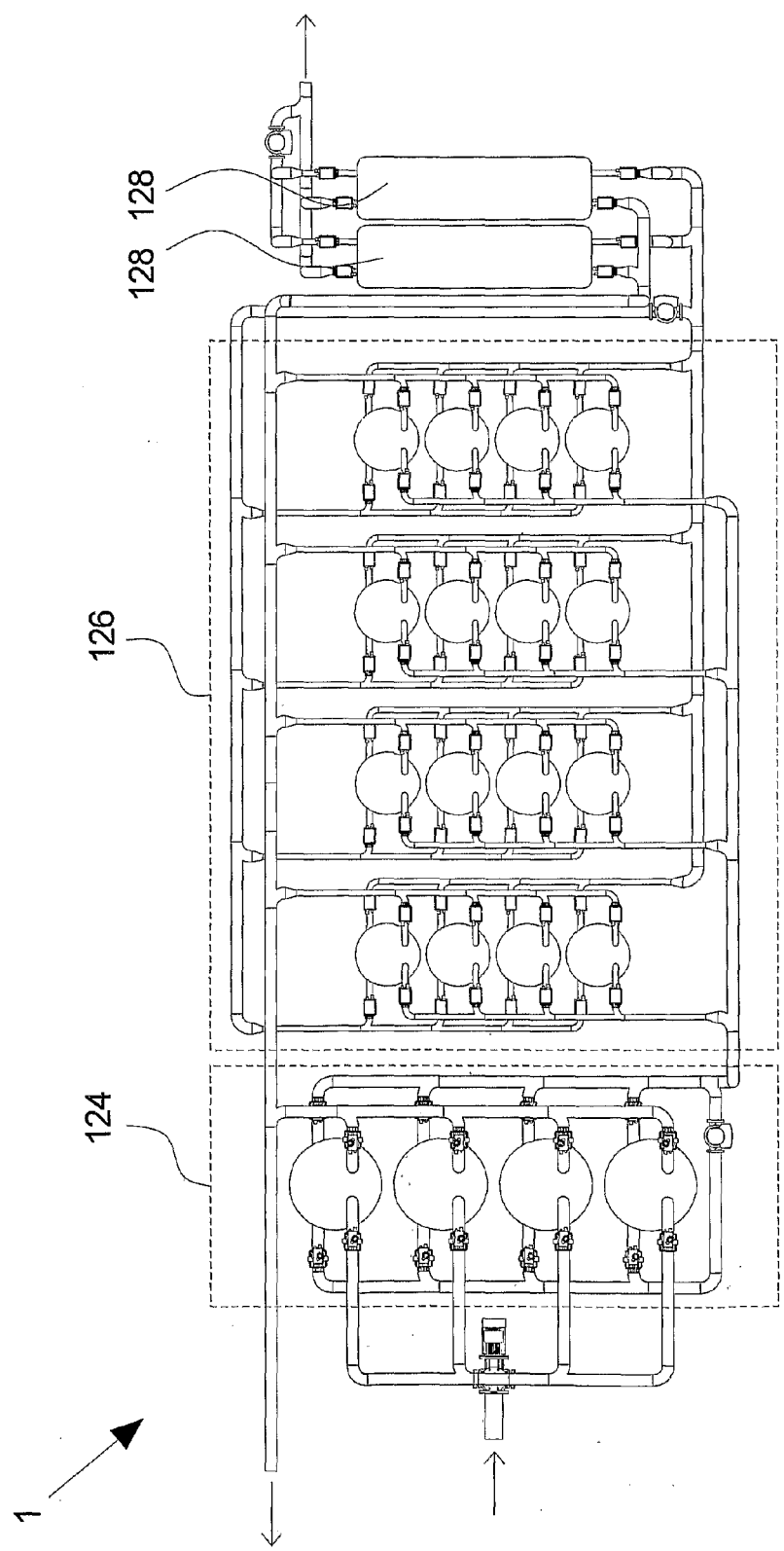
FIG. 7 shows a filter unit according to the invention, comprising filter means for at least partly purifying water into drinking water.

FIG. 7 illustrates an embodiment of a filter unit 1 according to the invention, comprising filter means for at least partly purifying the filtered water into drinking water 128. The filter unit 1 comprises a first filter module 124 comprising four filter elements for pre-filtration of the impure water, and a second filter module 126 comprising sixteen filter elements for further filtration of the water. The filter unit 1 in FIG. 7 further comprise filter means for at least partly purify the filtered water into drinking water 128. The filter means 128 is in an exemplary embodiment of the invention reverse osmosis filters, but it could also be forward osmosis filters or the like. It is to be understood that the filter modules could comprise further (or fewer) filter elements as well. Likewise the filter unit 1 could comprise two filter means for at least partly purify the filtered water into drinking water 128 as illustrated, but it could also comprise one four or even more filter means for at least partly purify the filtered water into drinking water.

In an embodiment of the invention, ozone ($O_3$) is applied to the liquid (e.g. water) or air for backwashing of the filter elements. This is advantageous in relation to removal of organic material/growth, and/or lipids such as fats from the filter elements. The use of ozone is especially advantageous in relation to waste water treatment, since ozone is a powerful oxidant which does not, by proper handling, harm the environment or leave behind toxic by-products. The ozone may be applied from an external ozone source, and/or it may be produced by UV ozone generators. Likewise, ozone may be applied to the water to be cleansed, e.g. during the cleansing of the water, to remove organic material/growth or fats from the water being filtered.

It should be understood that the invention is not limited to the particular examples described above but may be designed and altered in a multitude of varieties within the scope of the invention. Likewise it should be understood that even though the filter unit according to the invention desirably are used for purification of impure water, is understood that the filter unit could be adapted for purification of a plurality of other liquids.

The invention claimed is:

1. A filter unit for filtering a liquid, said filter unit comprising at least one dead end filter element made of a permeable material for filtering a liquid, which at least one dead end filter element comprising a top end, a bottom end and a plurality of substantially parallel arranged channels comprising a first end and a second end, which plurality of substantially parallel arranged channels being separated by walls of said permeable material, wherein the end of a first group of said channels are blocked at said top end of said dead end filter element and open at said bottom end of said dead end filter element, and the end of a second group of said channels are blocked at said bottom end of said dead end filter element and open in said top end of said dead end filter element, wherein said at least one dead end filter element is arranged so that the longitudinal axis of said channels are kept in an angle between 10° and 170° compared to horizontal, such as between 30° and 150°, preferred between 70° and 110° such as around 90°, and wherein said filter unit comprises a flow driving arrangement for providing a fluid flux from the openings of the channels comprising open ends at the top end of said at least one dead end filter element, into the channels comprising open ends at the top end of said at least one dead end filter element, through the walls of permeable material to the channels comprising open ends at the bottom end of said at least one dead end filter element, and out of the open ends at the bottom end of the at least one dead end filter element.

2. A filter unit for filtering a liquid according to claim 1, wherein the flow driving arrangement comprises a vacuum arrangement arranged for providing a vacuum at the bottom end of said at least one dead end filter element.

3. A filter unit for filtering a liquid according to claim 2, whereby said vacuum arrangement is suitable for providing a vacuum at the bottom end of said at least one dead end filter element, in the range of 0.01-0.9 bar such as between 0.3 and 0.8 bar.

4. A filter unit for filtering a liquid according to claim 1, wherein the flow driving arrangement comprises pressure means arranged for providing a pressure at the top end of at least one of said at least one dead end filter element.

5. A filter unit for filtering a liquid according to claim 1, wherein said dead end filter element is a ceramic filter element.

6. A filter unit for filtering a liquid according to claim 1, wherein said dead end filter element is made from sintered silicon carbide.

7. A filter unit according to claim 1, wherein said filter unit is adapted to release particles intercepted from a liquid filtered by said at least one dead end filter elements filter element by means of pressurised air and/or water applied at the bottom end of said at least one dead end filter element.

8. A filter unit according to claim 1, wherein the pore sizes of the filter elements is between 2 mm and 0.001 µm, e.g. between 20 µm and 0.03 µm, such as between 15 µm and 0.04 µm.

9. A filter unit according to claim 1, wherein said filter unit comprises a gas outlet arrangement.

10. A filter unit according to claim 1, said filter unit comprising at least two of said dead end filter elements wherein at least one of said at least two dead end filter elements, having a first pore size, is arranged in a first filter module,
wherein at least one other of said at least two dead end filter elements is arranged in a second filter module, said second filter module being serially arranged after the first filter module to filter water that in operation has been filtered by the first filter module, the pore size of the at least one dead end filter element of said second filter module being of a smaller pore size than the at least one filter element of said first filter module, and
wherein liquid from the open ends of the channels at the bottom end of the at least one dead end filter element arranged in said first filter module is adapted to be let into the open ends of the channels adapted to be inlets of the at least one dead end filter element arranged in the at least one second filter module.

11. A filter unit according to claim 10, wherein a vacuum arrangement is arranged for providing a vacuum at the bottom end of the at least one dead end filter element arranged in the last one of the serially arranged filter modules.

12. A filter unit according to according to claim 10, wherein at least one of said filter modules comprises at least two parallel arranged dead end filter elements.

13. A filter unit according to claim 1, wherein the filter unit is configured to remove silt from water.

14. A filter unit according to claim 1, wherein the filter unit is configured to purify recirculated chlorinated water.

15. A filter unit according to claim 1, wherein the filter unit is configured to purify slurry.

16. A filter unit according to claim 1, wherein the filter unit is configured to purify water into drinking water.

17. A filter unit according to claim 16, wherein the filter unit is configured to remove silt from the water.

18. Method of use of a dead end filter element made of a permeable material for filtering a liquid, said dead end filter element comprising a top end, a bottom end and a plurality of substantially parallel arranged channels comprising a first end and a second end, which plurality of substantially parallel arranged channels being separated by walls of said permeable material, wherein the end of a first group of said channels are blocked at said top end of said dead end filter element and open at said bottom end of said dead end filter element, and the end of a second group of said channels are blocked at said bottom end of said dead end filter element and open in said top end of said dead end filter element,
wherein said dead end filter element is arranged so that the longitudinal axis of said channels are kept in an angle between 10° and 170° compared to horizontal, e.g. between 30° and 150°, preferred between 70° and 110° such as around 90°, and
wherein, a fluid flux is lead from the openings of the channels comprising open ends at the top end of said at least one dead end filter element, into the channels comprising open ends at the top end of said at least one dead end filter element, through the walls of permeable material to the channels comprising open ends at the bottom end of said at least one dead end filter element, and out of the open ends at the bottom end of the at least one dead end filter element is created by means of a vacuum applied at the bottom end of said dead end filter element.

19. Method of use of a dead end filter element according to claim 18, wherein flocculation chemical is added to the impure water before the liquid reaches the inlets of the filter element.

20. Method of use of a dead end filter element according to claim 18 comprising the step of using the filter unit for removal of silt from water.

* * * * *